(12) United States Patent
Hirakata

(10) Patent No.: US 8,064,009 B2
(45) Date of Patent: Nov. 22, 2011

(54) LIQUID CRYSTAL CELL AND LIQUID CRYSTAL DISPLAY APPARATUS

(75) Inventor: Junichi Hirakata, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 581 days.

(21) Appl. No.: 11/817,598

(22) PCT Filed: Mar. 3, 2006

(86) PCT No.: PCT/JP2006/304679
§ 371 (c)(1),
(2), (4) Date: Dec. 22, 2008

(87) PCT Pub. No.: WO2006/093358
PCT Pub. Date: Sep. 8, 2006

(65) Prior Publication Data
US 2009/0213302 A1   Aug. 27, 2009

(30) Foreign Application Priority Data
Mar. 3, 2005   (JP) ................. 2005-058435

(51) Int. Cl.
G02F 1/13363   (2006.01)
(52) U.S. Cl. ................. 349/75; 349/119
(58) Field of Classification Search ............. None
See application file for complete search history.

(56) References Cited

U.S. PATENT DOCUMENTS

| | | | | |
|---|---|---|---|---|
| 5,499,126 A | * | 3/1996 | Abileah et al. | 349/106 |
| 5,589,963 A | * | 12/1996 | Gunning et al. | 349/119 |
| 2002/0063827 A1 | * | 5/2002 | Wu | 349/117 |
| 2004/0105059 A1 | * | 6/2004 | Ohyama et al. | 349/114 |
| 2004/0189909 A1 | * | 9/2004 | Kashima | 349/117 |
| 2006/0001798 A1 | * | 1/2006 | Jang et al. | 349/96 |

FOREIGN PATENT DOCUMENTS

| | | |
|---|---|---|
| JP | 10-507008 A | 7/1998 |
| JP | 11-109325 A | 4/1999 |
| JP | 2001-188125 A * | 7/2001 |
| JP | 2003-322857 A | 11/2003 |
| JP | 2004-37837 A | 2/2004 |
| JP | 2004-133171 A | 4/2004 |
| WO | WO 96/10771 A1 | 4/1996 |
| WO | WO 2004/090024 A1 * | 10/2004 |
| WO | WO 2006/010431 A1 * | 2/2006 |

OTHER PUBLICATIONS

PCT/ISA/210 and PCT/ISA/237 for PCT/JP2006/304679 dated Apr. 11, 2006. Notification Concerning International Preliminary Report on Patentability and International Preliminary Report (Forms PCT/IB/326 and PCT/IB/373), issued in PCT/JP2006/304679, Sep. 20, 2007, International Bureau of WIPO, Geneva, CH.
Written Opinion of the International Searching Authority (Form PCT/ISA/237) issued in PCT/JP2006/304679, Apr. 11, 2006, Japan Patent Office, Tokyo, JP.
Office Action (Notification of Reason(s) for Refusal) issued by the Japanese Patent Office in corresponding Japanese Patent Application No. 2006-056232, and dated Sep. 6. 2011. with an English translation thereof.

* cited by examiner

*Primary Examiner* — Mike Stahl
(74) *Attorney, Agent, or Firm* — Buchanan Ingersoll & Rooney PC

(57) ABSTRACT

A novel liquid crystal display apparatus is disclosed. The apparatus comprises a liquid crystal cell comprising a pair of substrates which are provided in mutually opposed manner and which has an electrode in at least either thereof, and a liquid crystal material supported between the pair of substrates; a first polarizing film disposed outside the liquid crystal cell; and at least an in-cell optical compensation film disposed between the pair of substrates, with plural domains per a pixel having a different mean alignment direction each other.

7 Claims, 8 Drawing Sheets

(a) SINGLE DOMAIN   (b) MULTI DOMAIN (a)  (b)

LIQUID CRYSTAL CELL AND LIQUID CRYSTAL DISPLAY APPARATUS

TECHNICAL FIELD

The present invention relates to a liquid crystal cell and a liquid crystal display improved in viewing angle property.

RELATED ART

A liquid crystal display device usually comprises a liquid crystal cell and polarizing plates. The polarizing plate usually has protective films and a polarizing film, and is obtained typically by dying the polarizing film composed of a polyvinyl alcohol film with iodine, stretching, and being stacked on both surfaces thereof with the protective films. A transmissive liquid crystal display device usually comprises polarizing plates on both sides of the liquid crystal cell, and occasionally comprises one or more optical compensation films. A reflective liquid crystal display device usually comprises a reflector plate, the liquid crystal cell, one or more optical compensation films, and a polarizing plate in this order. The liquid crystal cell comprises liquid-crystalline molecules, two substrates encapsulating the liquid-crystalline molecules, and electrode layers applying voltage to the liquid-crystalline molecules. The liquid crystal cell switches ON and OFF displays depending on variation in orientation state of the liquid-crystalline molecules, and is applicable both to transmission type and reflective type, of which display modes ever proposed include TN (twisted nematic), IPS (in-plane switching), OCB (optically compensatory bend) VA (vertically aligned), and ECB (electrically controlled birefringence).

As LCD display devices, which are required a high display quality, 90°-twisted nematic liquid crystal display devices (referred to as TN-mode, hereinafter), employing nematic liquid crystal molecules having a positive dielectric anisotropy and driven by thin-film transistors, have been provided. However, such TN-mode display, exhibits excellent display qualities only when viewed in the vertical direction, and there is a decrease of contrast deterioration, a grayscale inversion, which is crossing of the tone level in the tone image, or the like when viewed under an oblique angle. And, thus, improvement on such viewing angle characteristics when viewed under an oblique angle has been strongly required.

Recently, as an improvement of such viewing angle characteristics utilized in LCD, there is proposed a liquid crystal display device employing vertical alignment mode (hereinafter called VA mode) as shown in FIG. 8, utilizing a nematic liquid crystal molecule having a negative dielectric anisotropy, aligning the liquid crystal molecules with their longer axes substantially perpendicular to a substrate in a state without a voltage application, and driving such molecules by a thin film transistor (JPA No. 2002-221622, the term "JPA" as used herein means an "unexamined published Japanese patent application (Kohkai Tokkyo Kohou)")). Such VA-mode liquid crystal layer, of which retardation is optically compensated with at least one retardation film, not only has excellent display characteristics when viewed in the vertical direction as in the TN-mode, but also shows little change in the luminance in a black state when viewed under any oblique angle, thus providing little viewing angle dependence. Also it can exhibit a wide viewing angle in a white state, by utilizing a multi-domain liquid crystal cell structure in which a pixel is divided into alignment areas of four directions different from each other. In such VA mode, it is already known that a viewing angle property can be improved by employing two negative monoaxial retardation films, having an optical axis perpendicular to the film plane, respectively on and under the liquid crystal cell, and that a viewing angle property can be more improved by further employing a monoaxially oriented retardation film having a positive refractive index anisotropy and a planar retardation of 50 nm on such LCD (1SID97, digest p. 845-848).

However, such use of two retardation films (1SID97, digest p. 845-848) not only results in an increased production cost but also leads to drawbacks of a lowered production yield in adhering plural films and an increased thickness by the use of plural films, unfavorable for a thickness reduction of the display apparatus. Also an adhesion layer disposed between the oriented films may show a contraction by changes in temperature and humidity, thus resulting in defects such as a peeling or a bending of the films, or particularly an un-uniformity in the image display in a peripheral portion of the display panel. For improving these points, methods are disclosed for reducing the number of retardation films in JPA No. hei 11-95208. However, these methods, though effective for the viewing angle property in the black state, cannot completely solve a drawback of deterioration in the color reproduction (color washout, or a saturation loss in displayed color) in a white state when viewed under an oblique angle.

SUMMARY OF THE INVENTION

An object of the present invention is to provide a liquid crystal display apparatus, particularly a VA-mode liquid crystal display apparatus, in which a liquid crystal cell is exactly compensated optically, thereby providing a high contrast. In particular, an object of the present invention is to provide a liquid crystal display apparatus and liquid crystal cell of VA mode, which are improved in the color reproducibility in a white state when viewed at an oblique angle, are decreased in the contrast change depending on a viewing angle, and are reduced in the peripheral part of the image displaying area.

In one aspect, the present invention provides a liquid crystal display apparatus comprising:

a liquid crystal cell comprising a pair of substrates which are provided in mutually opposed manner and which has an electrode on at least either thereof, and a liquid crystal material supported between the pair of substrates;

a first polarizing film disposed outside the liquid crystal cell; and at least an in-cell optical compensation film disposed between the pair of substrates, with plural domains per a pixel having a different mean alignment direction each other.

The liquid crystal display apparatus of the present invention may further comprise a second polarizing film disposed sandwiching the liquid crystal cell with the first polarizing film.

The in-cell optical compensation film may be formed of a composition comprising at least one liquid crystalline compound, or a composition comprising at least one discotic compound. And, in the in-cell optical compensation film, molecules may be aligned in a hybrid alignment state with regard to a film plane.

The liquid crystal display apparatus of the present invention may further comprises at least an external optical compensation film disposed between the first or second polarizing film and the liquid crystal cell. And for such an embodiment, it is preferred that all the in-cell optical compensation film and the external optical compensation film have a total Re within a range of 20 to 70 nm and a total Rth within a range of 70 to 200 nm.

As a preferred embodiment of the present invention, there is provided the liquid crystal display apparatus wherein a thickness d (unit: nm) of the liquid crystal layer, a refractive index anisotropy Δn(λ) of the liquid crystal layer at a wavelength λ (unit: nm), a total average planar retardation Re(λ) of the in-cell optical compensation film and the external optical compensation film at a wavelength λ and a total average retardation Rth(λ) in thickness direction at a wavelength λ satisfy, in at least two different wavelengths within a wavelength region of 380 to 780 nm, following formulas (V) to (VIII):

$$100 \leq \Delta n(\lambda) \times d \leq 1000, \quad (V)$$

$$Rth(\lambda)/\lambda = E \times \Delta n(\lambda) \times d/\lambda, \quad (VI)$$

$$Re(\lambda)/\lambda = F \times \lambda/\{\Delta n(\lambda) \times d\} + G, \text{ and} \quad (VII)$$

$$0.726 \leq E \leq 0.958, \quad (VIII)$$

wherein $0.0207 \leq F \leq 0.0716$ and $G=0.032$.

As embodiments of the present invention, there are provided the liquid crystal display apparatus wherein the in-cell optical compensation film comprises plural domains, one of which retardation value is different from that of another domain; the liquid crystal display apparatus wherein a retardation value or a mean alignment direction varies discontinuously along with a thickness direction in a region, corresponding to a pixel, of the in-cell optical compensation film; and the liquid crystal display apparatus wherein the in-cell optical compensation film comprises a dye.

In another aspect, the present invention provides a liquid crystal cell comprising:

a pair of substrates which are provided in mutually opposed manner and which has an electrode in at least either thereof;

a liquid crystal material supported between the pair of substrates; and at least an in-cell optical compensation film disposed between the pair of substrates, with plural domains per a pixel having a different mean alignment direction each other.

According to the present invention, by disposing a multi-domain optical compensation film, which is formed through suitable selection of materials and a producing method, between a pair of substrates of a liquid crystal cell, it is possible to provide a liquid crystal apparatus which is improved in a transmittance loss due to multiple reflection and in a luminance or a contrast ratio. And it is also possible to improve the color reproducibility in a white state and to reduce the viewing angle dependence of the luminance by optically compensating the retardation of the liquid crystal layer with the multi-domain optical compensation film in which an aligning direction in each domain is different in planar or in thickness direction, or in which a retardation in each domain is different in planar or thickness direction.

In the present description, "parallel" or "perpendicular" means within a range less than ±5° with respect to an exact angle. An error from the exact angle is preferably less than 4°, and more preferably less than 3°. Also about an angular direction, "+" indicates a clockwise direction and "−" indicates a counterclockwise direction. Also the term of "slow axis" means a direction where the refractive index becomes a maximum value. A "visible light region" means a wavelength region of 380 to 780 nm. Also the refractive index is a value measured at λ=550 nm within the visible light region, unless specified otherwise.

In the present description, the term of "polarizing plate" is used for both a polarizing plate in a continuous web form, and a polarizing plate which is cut into a size for incorporation in a liquid crystal apparatus (in the present description, "cutting" includes "punching", "cutout" and the like), unless particularly specified. Also in the present description, the terms of "polarizing film" and "polarizing plate" are used in different meanings, and a "polarizing plate" means a laminate member having, on at least a side of a "polarizing film", a transparent protective film for protecting the polarizing film.

And in the specification, Re(λ) and Rth(λ) respectively mean an in-plane retardation and a retardation in a thickness-direction at wavelength λ. The Re(λ) is measured by using KOBRA-21ADH (manufactured by Oji Scientific Instruments) for an incoming light of a wavelength λ nm in a vertical direction to a film-surface. The Rth(λ) is calculated by using KOBRA-21ADH based on plural retardation values which are measured for incoming light of a wavelength λ nm in eleven directions which are decided by a 10° step rotation from −50° to +50° with respect to the vertical direction of the film using an in-plane slow axis, which is decided by KOBRA 21ADH, as an a tilt axis (a rotation axis); a value entered as a hypothetical mean refractive index; and a value entered as a thickness value of the film. The mean refractive indexes of various materials are described in published documents such as "POLYMER HANDBOOK" (JOHN WILEY&SONS, INC) and catalogs, and can be used for the above calculation. If the values are unknown, the values may be measured with an abbe refractometer or the like. The mean refractive indexes of major optical films are exemplified below:

cellulose acylate (1.48), cyclo-olefin polymer (1.52), polycarbonate (1.59), polymethyl methacrylate (1.49), polystyrene (1.59).

When a value of hypothetical mean refractive index and a thickness of the film are entered, KOBRA 21ADH calculates the values of nx, ny and nz. And the value Nz(=(nx−nz)/(nx−ny)) is calculated based on the values of nx, ny and nz.

IN THE DRAWINGS, NUMERICAL SYMBOLS HAVE FOLLOWING MEANINGS

Figure 1:
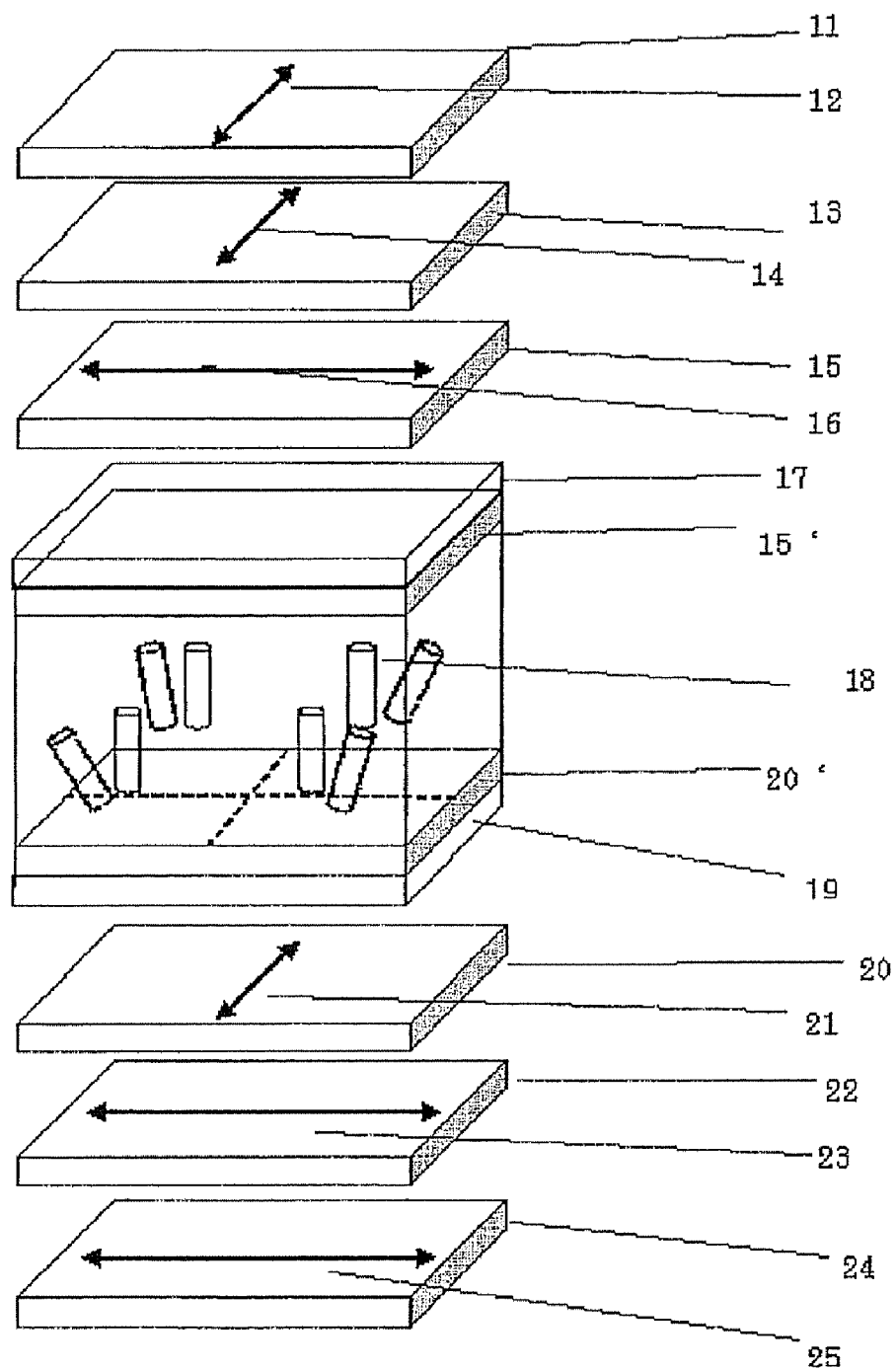
FIG. 1 is a schematic view showing constitution of an embodiment of a liquid crystal display apparatus of the present invention.

1 polarizing plate
2 polarizing plate
3 liquid crystal cell
4, 5, 6 optical compensation film
13, 22 polarizing film
14, 23 absorbing axis 11, 24 protective film
12, 25 in-plane slow axis
15, 20 external optical compensation film (protective film)
15', 20' in-cell optical compensation layer
16, 21 in-plane slow axis
17, 19 substrate
18 liquid crystalline molecules
26, 27, 28, 29, 30 viewing direction
31 measurement area
32 discotic compound.

DETAILED DESCRIPTION OF THE INVENTION

In the following, the present invention will be explained with reference to the accompanying drawings. In the specification, ranges indicated with "to" mean ranges including the numerical values before and after "to" as the minimum and maximum values.

[Liquid Crystal Display Apparatus]

A liquid crystal display apparatus shown in FIG. 1 comprises a liquid crystal cell 17 to 19, and an upper polarizing film 13 and a lower polarizing film 22 disposed sandwiching the liquid crystal cell 17 to 19. Each of the polarizing films 13 and 22 is sandwiched by a pair of transparent protective films, and, in the constitution shown in FIG. 1, the transparent protective films disposed closer to the liquid crystal cell also function as external optical compensation layers 15 and 20, positioned outside substrates of the liquid crystal cell. Thus, the upper polarizing film 13 is sandwiched between a transparent protective film 11 and an external optical compensation layer 15, and the lower polarizing film 22 is sandwiched between a transparent protective film 24 and an external optical compensation layer 20. The liquid crystal cell comprises an upper liquid crystal cell substrate 17, a lower liquid crystal cell substrate 19 and liquid crystal molecules 18 sandwiched therebetween, and the liquid crystal molecules 18 are controlled in an aligning direction thereof by alignment films or rubbing directions applied on mutually opposed faces of the substrates 17 and 19.

In the structure, one pixel is divided into four domains, and the liquid crystal molecules 18 are tilted in four directions under a voltage application. Also in-cell optical compensation layers 15', 20' are disposed respectively between the upper substrate 17 and the liquid crystal layer and between the liquid crystal layer and the lower substrate 19.

The liquid crystal cell is constituted of the upper substrate 17, the lower substrate 19, a liquid crystal layer formed of liquid crystal molecules 18 supported therebetween, and the in-cell optical compensation layers 15', 20' formed on the internal surfaces of the upper substrate 17 and the lower substrate 19. On the surfaces of the substrates 17, 19 in contact with the liquid crystal molecules 18 (such surfaces being hereinafter also called "internal surfaces"), alignment films (not shown), which, for example by a rubbing process applied thereon, are formed and controls the alignment of the liquid crystal molecules 18 in a state without voltage application or with a low voltage application. Also the substrates 17, 19 are provided, on internal surfaces thereof, with transparent electrodes (not shown) capable of applying a voltage to the liquid crystal layer formed of liquid crystal molecules 18.

The liquid crystal layer is not particularly limited in the display mode, and may employ any mode such as VA mode, IPS mode, ECB mode, TN mode or OCB mode.

In the present invention, a product $\Delta n \cdot d$ of a thickness d (μm) of the liquid crystal layer and a refractive index anisotropy $\Delta n$ is preferably selected within a range of 0.1 to 1.0 μm.

An optimum value of $\Delta n \cdot d$ depends on the display mode. In the transmission modes, the preferred range is 0.2 to 0.4 μm in VA, IPS or ECB mode without a twisted structure, is 0.2 to 0.5 μm in TN mode though dependent on the twist angle, and is 0.6 to 1.0 μm in the OCB mode. An LCD, employing such range, can give a high luminance in a white state and a low luminance in a black state, and, therefore, can exhibit high contrast.

FIG. 1 illustrates an embodiment of the display apparatus of a transmission mode, comprising the upper polarizing plate and the lower polarizing plate, but the present invention is also applicable to an embodiment of reflective mode comprising only one polarizing plate, and, in such case, the preferred value of is $\Delta n \cdot d$ is about a half of the above-mentioned values since the optical path within the liquid crystal cell is doubled. According to a reflective liquid crystal display apparatus comprising only one polarizing plate at the upper side (viewing side), the polarizing light is rotated by propagating through an optical compensation film with a λ/4 phase difference (for example cf. JPA No. hei 7-218906). For such a reflective liquid crystal display, employing only one polarizing plate can contribute to avoiding attenuation of the transmittance. According to the present invention, at least one optical compensation film is disposed between the substrates of the liquid crystal cell, thereby reducing the loss of transmitted light by multiple reflection, even when employing two polarizing plates. It is also possible to add a dye to the optical compensation film disposed between the substrate (in-cell optical compensation film), thereby adding a function as a polarizing film.

Absorption axes 14, 23 of the polarizing plates 13, 22, in-plane slow axes 16, 21 of the external optical compensation layers (transparent protective films) 15, 20 and an aligning direction of the liquid crystal molecules 18 can be regulated within optimum ranges according for example to materials employed various members, a display mode, and a laminated structure of the members. For example, in a liquid crystal display apparatus of normally black type such as VA or IPS type, the absorption axes 14, 23 of the polarizing films 13, 22 are so positioned as to be mutually perpendicular, in order to obtain a high contrast. However, the liquid crystal display apparatus of the invention is not limited to such constitution.

For the embodiment shown in FIG. 1, it is preferred that a thickness d (unit: nm) of the liquid crystal layer, a refractive index anisotropy $\Delta n(\lambda)$ of the liquid crystal layer at a wavelength λ (unit: nm), a total average planar retardation Re(λ) of the in-cell optical compensation film 15', 20' and the external optical compensation film 15, 20 at a wavelength λ and a total average retardation Rth(λ) in thickness direction at a wavelength λ satisfy, in at least two different wavelengths within a wavelength region of 380 to 780 nm, following formulas (V) to (VIII):

$$100 \leq \Delta n(\lambda) \times d \leq 1000, \quad (V)$$

$$Rth(\lambda)/\lambda = E \times \Delta n(\lambda) \times d/\lambda, \quad (VI)$$

$$Re(\lambda)/\lambda = F \times \lambda/\{\Delta n(\lambda) \times d\} + G, \text{ and} \quad (VII)$$

$$0.726 \leq E \leq 0.958, \quad (VIII)$$

wherein $0.0207 \leq F \leq 0.0716$ and G=0.032.

The LCD, shown in FIG. 1, comprising the elements which satisfy the formulas (V) to (VIII) is improved in contrast in a black state and is reduced in coloring in a black state when viewed under an oblique angle.

The liquid crystal display apparatus of the invention is not limited to the structure shown in FIG. 1, but may further include another member. For example, a color filter may be positioned between the liquid crystal cell and the polarizing film. Also another protective film may be positioned between the liquid crystal cell and the polarizing plate, as will be explained later. Also in a use as a transmission type, a backlight, utilizing a cold or hot cathode fluorescent lamp, a light-emitting diode, a field emission device or an electroluminescent device as a light source may be provided at the back side. Also the liquid crystal display apparatus of the invention may be of a reflective type, and, in such case, a reflective film is provided on a rear surface of the liquid crystal cell or on an internal surface of the lower substrate of the liquid crystal cell. It is naturally possible also to provide a frontlight, utilizing the aforementioned light source, on the observing side of the liquid crystal cell.

The liquid crystal display apparatus of the invention may be applied to a direct image observing type, an image projection type and a light modulation type. The present invention is particularly effective in an embodiment applied to an active matrix liquid crystal display apparatus utilizing a three- or two-terminal semiconductor device such as TFT or MIM. It is naturally effective also in an embodiment applied to a passive matrix liquid crystal display apparatus, of so-called time shared drive, as represented by STN type.

Functions of the liquid crystal display apparatus shown in FIG. 1 will be explained by an example of the VA mode. This embodiment will be explained by an example of active drive, with a nematic liquid crystal having a positive dielectric anisotropy as a field effect liquid crystal.

In the liquid crystal display apparatus shown in FIG. 1, in a non-driven state in which no drive voltage is applied to the transparent electrodes (not shown) of the substrates 17, 19 of the liquid crystal cell, the liquid crystal molecules 18 in the liquid crystal layer are aligned substantially perpendicularly to the plane of the substrates 17, 19, so that the propagating light scarcely changes in a polarized state thereof. As the absorbing axes 14, 23 are mutually perpendicular, a light entered from the lower side (for example from a rear electrode) is polarized by the polarizing film 22, then passes the liquid crystal cell while maintaining the polarized state, and is intercepted by the polarizing film 13. Thus, the liquid crystal display apparatus shown in FIG. 1 provides an ideal black state in a non-driven state. On the other hand, in a driven state in which a drive voltage is applied to the transparent electrode (not shown in FIG. 1), the liquid crystal molecules 18 become tilted toward a direction parallel to the planes of the substrates 17, 19, whereby the transmitted light is subjected to a change in the polarized state by such tilted liquid crystal molecules 18. Therefore, a light incoming from the lower side (for example from a rear electrode) is polarized by the polarizing film 22, then subjected to a change in the polarized state upon passing the liquid crystal cell, and is transmitted by the polarizing film 13. Thus the liquid crystal display apparatus shown in FIG. 1 provides a white state in the driven state.

According to this embodiment, as an electric field is applied between the substrates 17 and 19, a liquid crystal material with a negative dielectric anisotropy is employed, in which the liquid crystal molecule 18 responds perpendicularly to the direction of the electric field. According to another embodiment, an electrode is formed on either alone of the substrates 17 and 19 and an electric field is applied in a lateral direction parallel to the substrates, a liquid crystal material having a positive dielectric anisotropy may be employed.

[Black State]

Figure 2:
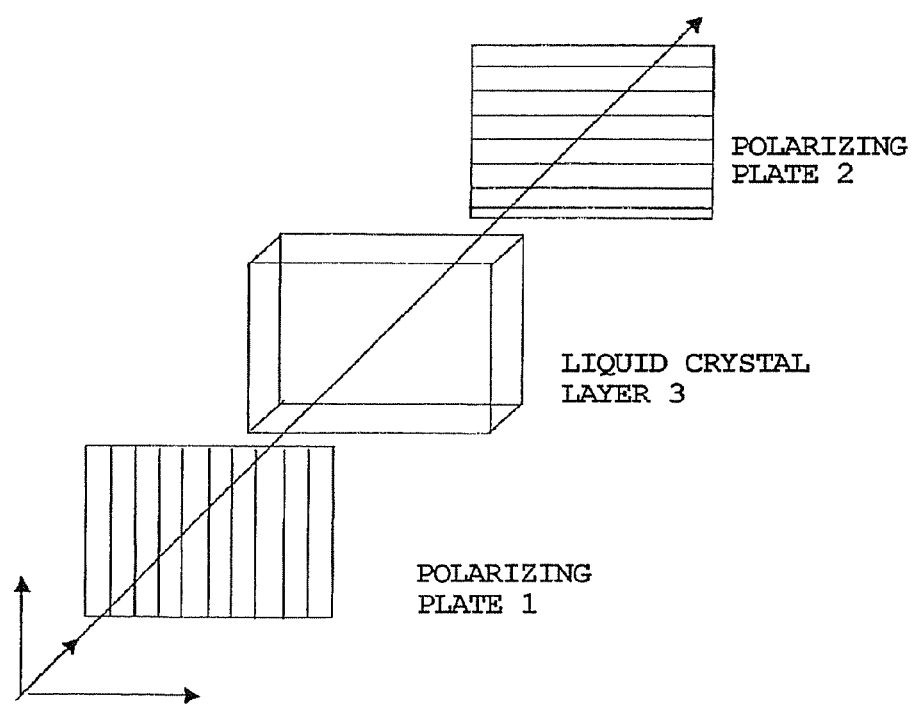
FIG. 2 is a schematic view showing constitution of a prior VA-mode liquid crystal display apparatus.

FIG. 2 is a schematic view showing the structure of a liquid crystal display apparatus of ordinary VA mode, which comprises a liquid crystal layer 3 in which the liquid crystal molecules are aligned perpendicularly with regard to a substrate surface in no voltage application or a black state, and polarizing plates 1 and 2 so positioned as to sandwich the liquid crystal layer 3 with mutually perpendicularly arranged transmission axes (as indicated by stripe lines in FIG. 2). In FIG. 2, the light is assumed to enter from the side of the polarizing plate 1. In a state of no voltage application, when a light enters in the vertical direction, namely in z-axis direction, the light transmitted by the polarizing plate 1 passes through the liquid crystal layer 3 while maintaining the linearly polarized state and is completely intercepted by the polarizing plate 2. As a result, high contrast images can be displayed.

Figure 3:
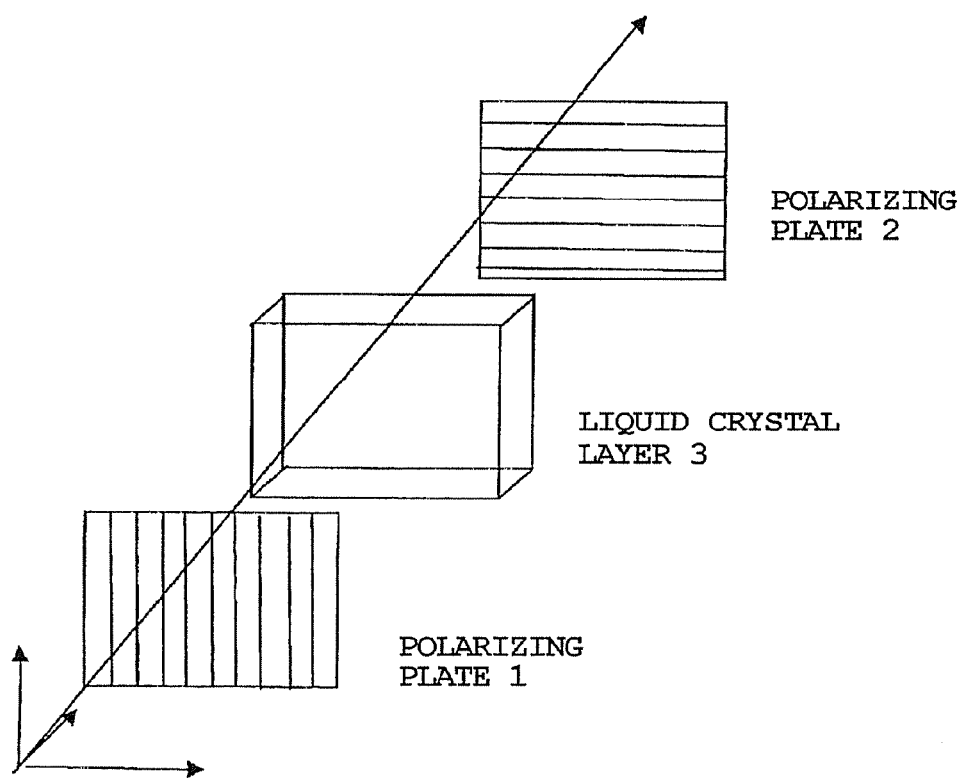
FIG. 3 is a schematic view showing constitution of a prior VA-mode liquid crystal display apparatus.

However, the situation becomes different in case of an oblique light as shown in FIG. 3. In case a light enters in a non-z-axis oblique direction, namely so-called off-axis direction inclined against the polarizing directions of the polarizing plates 1 and 2, such incident light, upon passing the vertically aligned liquid crystal layer 3, is influenced by retardation generated in an oblique direction, whereby the polarized state is changed. Also the apparent transmission axes of the polarizing plates 1, 2 become displaced from the perpendicular arrangement. Because of these two factors, the off-axis light in the oblique direction is not completely intercepted by the polarizing plate 2 but causes a light leakage in a black state, thereby lowering the contrast.

Now, definitions are given for a polar angle and an azimuthal angle. The polar angle indicates an inclination angle from a normal line to the film, namely from z-axis in FIGS. 2 and 3. For example, a normal line to the film has a polar angle of 0°. The azimuthal angle indicates a counterclockwise angle with regard to a positive x-axis. For example, a positive x-axis has an azimuthal angle of 0°, and a positive y-axis has an azimuthal angle of 90°. The off-axis oblique direction, mentioned above, means a direction with non-zero polar angle and principally with an azimuthal angle of 45°, 135°, 225° or 315°.

Figure 4:
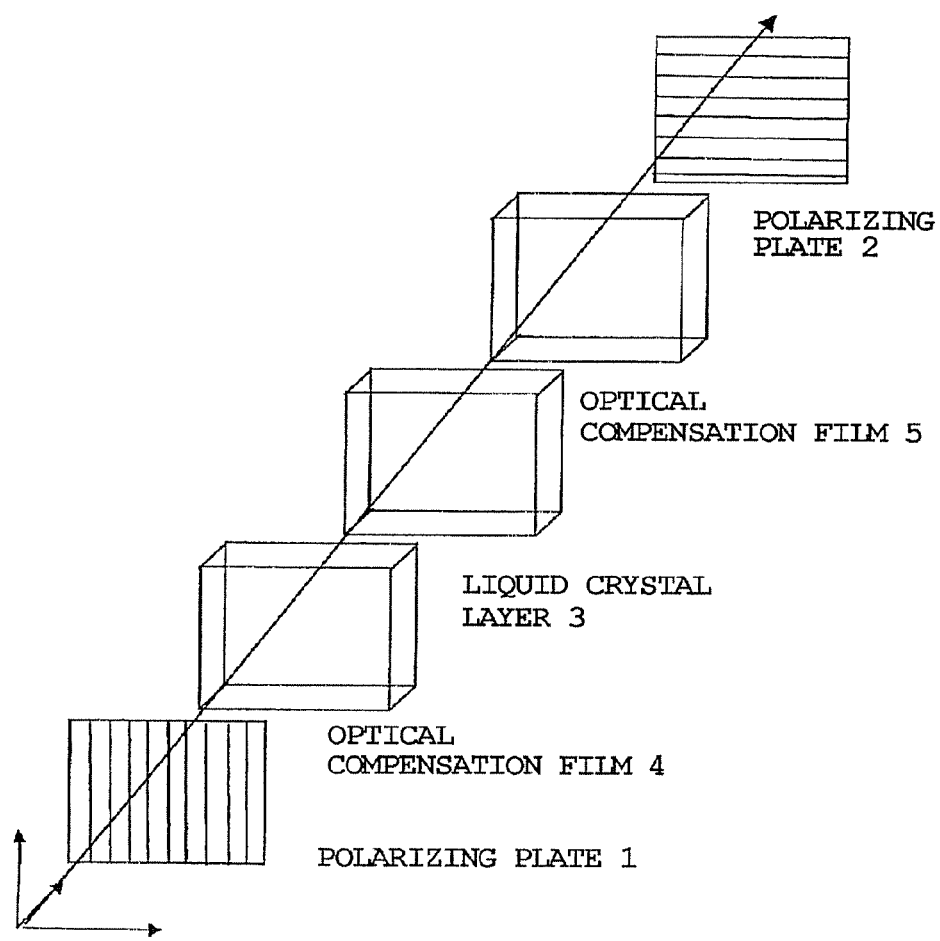
FIG. 4 is a schematic view showing constitution of an embodiment of a VA-mode liquid crystal display apparatus of the present invention.

FIG. 4 schematically shows a constitution for explaining the function of an embodiment of the present invention. A liquid crystal display apparatus shown in FIG. 4 comprises, in addition to the structure shown in FIG. 2, in-cell optical compensation films 4, 5 on the internal surfaces of a pair of substrates (corresponding to those 17, 19 in FIG. 1) constituting the liquid crystal cell. In the present embodiment, it is preferred that a thickness d (unit: nm, hereinafter same) of the liquid crystal layer, a refractive index anisotropy $\Delta n(\lambda)$ of the liquid crystal layer at a wavelength $\lambda$ (unit: nm, hereinafter same), an in-plane retardation $Re(\lambda)$ at a wavelength $\lambda$ and a retardation $Rth(\lambda)$ in a thickness direction at a wavelength $\lambda$ of the in-cell optical compensation films 4, 5 (corresponding to those 15', 20' in FIG. 1) satisfy following formulas (I) to (IV) in at least two different wavelengths between wavelengths of 380 nm and 780 nm:

$$200 \leq \Delta n(\lambda) \times d \leq 1000, \quad (I)$$

$$Rth(\lambda)/\lambda = A \times \Delta n(\lambda) \times d/\lambda + B, \quad (II)$$

$$Re(\lambda)/\lambda = C \times \lambda/\{\Delta n(\lambda) \times d\} + D, \text{ and} \quad \text{(III)}$$

$$0.488 \leq A \leq 0.56, \quad \text{(IV)}$$

wherein B=−0.0567,
−0.041≦C≦0.016 and
D=0.0939.

In the embodiment shown in FIG. 4, by combining the liquid crystal layer and the optical compensation film(s) satisfying the formulas (I) to (IV) (or in the embodiment shown in FIG. 1, by combining the liquid crystal layer and the optical compensation films the above mentioned formulas (V) to (VIII)), even for an incident light of a predetermined wavelength within the visible light region entering in an oblique direction, an optical compensation is made possible with an in-plane slow axis and a retardation matching the wavelength. As a result, in comparison with a prior liquid crystal display apparatus, a contrast in the black state is significantly improved and a coloring in the black state is significantly reduced, when viewed under an oblique angle. It is preferred that the liquid crystal display apparatus of the present invention satisfies the formulas (I) to (IV) or the formulas (V) to (VIII) at least at two different wavelengths. It is more preferred that the formulas (I) to (IV) or the formulas (V) to (VIII) are satisfied at two wavelengths different by 50 nm or more. Wavelength at which these conditions are satisfied depends on the application of the liquid crystal display apparatus, and a wavelength and a wavelength range most affecting the display characteristics may be selected. In general, the liquid crystal display apparatus preferably satisfies the formulas (I) to (IV) or the formulas (V) to (VIII), at wavelengths of 650, 550 and 450, corresponding to three primary colors of red (R), green (G) and blue (B). The above-mentioned wavelengths do not necessarily represent those of R, G and B colors, but are considered suitable for defining the optical characteristics providing the effects of the present invention.

In the prior technology, a wavelength dispersion in a compensation film for VA mode is defined by Re, Rth and Re/Rth. The present embodiment shows a principle of achieving a compensation for the VA-mode at a wavelength λ by utilizing dimensionless parameters Re/λ and Rth/λ instead of Re, Rth and Re/Rth. The present inventors focused on that the birefringence Δnd of the liquid crystal layer to be compensated also has a wavelength dispersion, and studied on a relationship between the wavelength dispersion of Re and Rth of the optical compensation film and the wavelength dispersion of the birefringence Δnd of the liquid crystal layer to be compensated, and found that the viewing angle characteristics of the liquid crystal display apparatus in a black state can be significantly improved in case the relations of the formulas (I) to (IV) or the formulas (V) to (VIII) are satisfied. In the liquid crystal display apparatus of the present embodiment, which satisfies the relations of the formulas (I) to (IV) or the formulas (V) to (VIII), even in case a light enters from an oblique direction, or, in other words, even in case that two factors of the retardation of the liquid crystal layer in the oblique direction and of the displacement in the apparent transmission axes of the paired polarizing plates are generated, the liquid crystal layer is correctly compensated optically and the contrast loss can be reduced.

For adjusting the Δnd value or the like within a preferred range, there may be employed, in addition to the aforementioned method of controlling the wavelength dependence of Δn of the liquid crystal material and the optical compensation film, a method controlling a thickness d or controlling both Δn and d of the liquid crystal layer and the optical compensation film. Particularly for thickness control, it is possible to vary the thickness of the liquid crystal layer and the optical compensation film for each of R, G and B pixels, thereby approaching to ideal wavelength dispersion of Δnd. It is also possible to change the thicknesses of the liquid crystal layer and the optical compensation film within a single pixel, and this method is effective for a semi-transmission mode, which works both as reflective mode and transmission mode.

In the VA-mode, since the liquid crystals are vertically aligned in a black state with no voltage application, the in-plane slow axis of the optical compensation film is preferably positioned perpendicular or parallel to the polarizing axis of a closer disposed polarizing plate, in order that the polarized state of the incident light along the normal line is not affected by the retardation of the optical compensation film.

As explained in the foregoing, according to the present embodiment, a relationship between so-called birefringence rate Δnd/λ of the liquid crystal layer in the VA-mode and Re/λ and Rth/λ of the optical compensation film are optimized depending on the spectral range or spectral distribution of the light source to be employed. The above mentioned compensation for VA-mode is distinguishable from the prior compensation technologies for VA-mode, in terms of theoretically clarifying and clearly indicating the optimum ranges of such values. By combining the liquid crystal layer and the optical compensation film(s) so as to satisfy the formulas (I) to (IV) or the formulas (V) to (VIII), the wavelength dispersion of the liquid crystal layer can be compensated by the wavelength dispersion of the optical compensation film. As a result, a viewing angle-dependent contrast change in a VA-mode panel can be reduced. Also a light leakage in the black state can be lowered over an arbitrary wavelength region, so that a viewing angle-dependent color aberration, resulting from a light leakage having a specific wavelength, can also be reduced.

The present embodiment employs the aforementioned formulas for defining the optimum values for the film, and confirms the effects of the embodiment by examples. In the formulas, parameters A, B, C and D or E, F and G define ranges providing the effects of the present embodiment. However, B and D or G are given as optimum constant values for representing the effective range of the film, and A and C, or E and F are given ranges for representing ranges providing the effects of the present embodiment.

The aforementioned embodiment is an embodiment applied the present invention to a VA-mode liquid crystal panel, and is improved in the viewing angle-dependent contrast change and the viewing angle-dependent color aberration by employing the combination, satisfying the aforementioned formulas, of a liquid crystal layer and an optical compensation film(s). The present invention is also applicable to a display apparatus employing R, G and B liquid crystal layers. For example, in case of applying the present invention to a projection-type apparatus in which R, G and B colors are obtained by different liquid crystal layers, the optical compensation can be achieved by the combination, satisfying the aforementioned formulas, of the liquid crystal layers and optical compensation films, thereby obtaining high contrast over a wide viewing angle. Also in a liquid crystal panel utilizing an ordinary light source emitting plural wavelengths light, high contrast over a wide viewing angle can be obtained by representing the characteristics of the liquid crystal panel for example at a wavelength G and employing a combination, satisfying the aforementioned formulas, of a liquid crystal layer and an optical compensation film(s).

The optical compensation film(s) to be employed in the present embodiment is not particularly limited, and may have any structure as long as it has an optical compensation capability. In the invention, at least an in-cell optical compensation film is disposed between the substrates sandwiching the liquid crystal layer. An in-cell optical compensation film with plural domains per a pixel may be disposed on either of the upper and lower substrates. An in-cell optical compensation film with plural domains per a pixel may be disposed on either or on each of the upper and lower substrates, as shown in FIG. 7(b). An in-cell optical compensation film with plural domains per a pixel may be disposed on each of the upper and lower substrates, or two or more in-cell optical compensation films may be disposed on either or on each of the upper and lower substrates. Also at least an external optical compensation film may be disposed between the substrate and the polarizing film, as shown in FIG. 1. Such external optical compensation film may be selected from polymer films showing a birefringence, or laminate members comprising a transparent substrate and at least one optically anisotropic layer of liquid crystal composition formed thereon.

The present invention is not restricted by the display mode of the liquid crystal layer, and may be employed in a liquid crystal display apparatus having a liquid crystal layer of any display mode, such as VA mode, IPS mode, ECB mode, TN mode or OCB mode.

[White State]

Figure 5:
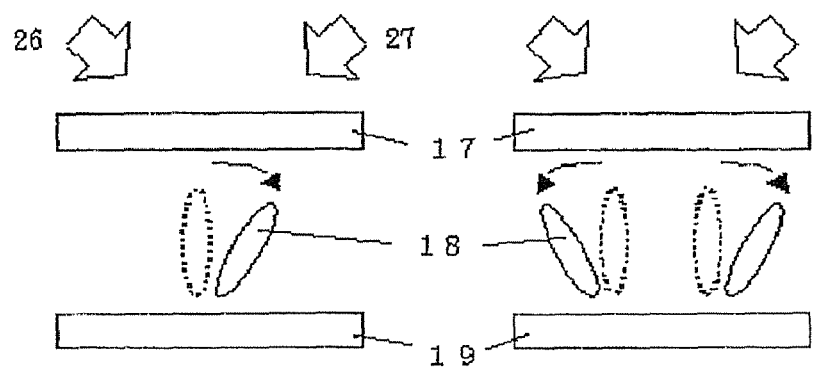
FIG. 5 is a schematic cross-sectional view showing constitution of an embodiment of a VA-mode liquid crystal display apparatus of the present invention.

FIG. 5(a) is a schematic cross-sectional view of a single-domain VA-mode liquid crystal cell. As the liquid crystal molecules 18 are tilted in a white state, the liquid crystal molecules 18 show different magnitudes of birefringence when viewed in an oblique direction 27 and in an opposite oblique direction 26, thus causing a difference in the luminance and in the color hue. On the other hand, FIG. 5(b) is a schematic cross-sectional view showing a multi-domain VA-mode liquid crystal cell in which a pixel of the liquid crystal cell is divided into two domains, in which the liquid crystal molecules are tilted in mutually opposite directions to provide an averaged tilt angle over a pixel, thereby improving the viewing angle characteristics in luminance and color.

For forming plural domains with different aligning directions of the liquid crystal molecules 18 within a pixel, there may be employed a method of forming a slit or a projecting part in the electrode thereby changing the direction of the electric field or generating a deviated density in the electric field. A viewing angle uniform in all the directions may be obtained by increasing the number of such division, but a substantially uniform viewing angle can be obtained by a division into 4 or 8 domains. In particular a division into 8 domains is preferred since the absorption axis of the polarizing plate can be set at an arbitrary angle.

The liquid crystal molecules 18 tend to show a lower response at the boundary of the domains. In a normally black mode such as VA-mode, the molecules may stay in the black state, thereby resulting in a lowered luminance. As a countermeasure, the boundary region between the domains can be reduced by adding a chiral agent to the liquid crystal material.

On the other hand, in a normally white mode, the molecules may stay in a white state, thereby lowering the contrast in the vertical direction. As a countermeasure, a light intercepting layer such as a black matrix may be formed so as to cover such region.

A liquid crystal cell of VA-mode can be prepared by positioning, between the upper and lower substrates 17, 19, for example a nematic liquid crystal material having a negative dielectric anisotropy with $\Delta n$ of 0.0813 and $\Delta \in$ of about −4.6 under a rubbing alignment so as to obtain a director, indicating the aligned direction of the liquid crystal molecules, or so-called tilt angle of about 89°. A thickness d of the liquid crystal layer is not particularly restricted, but may be set at about 3.5 μm in case of employing liquid crystal of the above-mentioned properties. As a brightness in the white state is governed by a product $\Delta n \cdot d$ of the thickness d and the refractive index anisotropy $\Delta n$, $\Delta n \cdot d$ is preferably selected within a range of 0.2 to 0.5 μm in order to obtain a maximum brightness.

In the liquid crystal display apparatus of VA-mode, the chiral agent commonly employing in a liquid crystal display apparatus of TN-mode is not much employed as it deteriorates the dynamic response characteristics, but may be added in order to reduce an alignment failure. It is also effective, in case of a multi-domain structure explained above, for regulating the alignment of the liquid crystal molecules in the boundary region between the domains.

In the foregoing, among various liquid crystal display modes, the VA-mode has been explained as one of so-called normally black modes in which a black state is given under no voltage application or under a low voltage application and a white state is given under a high voltage application, but the present invention is not limited to such mode and is also applicable to an embodiment utilizing the IPS-mode which is another normally black mode. It is further applicable to an embodiment utilizing a normally white mode in which a white state is given under no voltage application or under a low voltage application and a black state is given under a high voltage application, utilizing a liquid crystal cell of OCB, ECB or TN mode. It is furthermore applicable to a liquid crystal cell in which, in a black state, the liquid crystal molecules of a liquid crystal material are aligned substantially parallel to the surface of the substrate, and more specifically to a liquid crystal cell of IPS or ECB mode which provides a black state under no voltage application by aligning the liquid crystal molecules parallel to the substrate surface.

[Multi-Domain Formation in Optical Compensation Film]

In the present invention, at least an in-cell optical compensation film is disposed between a pair of substrates of the liquid crystal cell. In the following description, Re and Rth values of the optical compensation film mean a value averaged in an area corresponding to a pixel.

For the conventional VA-mode liquid crystal display apparatus, the viewing angle characteristics in a white state have been improved by using the above mentioned cell with plural domains, but a further improvement in the image quality is being desired along with an enlarging image size of the display apparatus. More specifically, in such VA-mode liquid crystal display apparatus, a deterioration in the color purity is recognized in a white state when viewed under an oblique angle. This is because, as shown in FIG. 5(a), Re of the liquid crystal layer increases in an observing direction 27 and decreases in an observing direction 26. The transmittance increases in the direction where the Re value of the liquid crystal layer increases, and the color purities of displayed images may become lower. And the transmittance remarkably decreases in the direction where the Re value of the liquid crystal layer decreases. The alignments of liquid crystalline molecules can be averaged in a multi-domain structure shown in FIG. 5(b), but the mean alignment direction is along the direction where the Re value of the liquid crystal layer increases, and, thus, the transmittance is increased and the displayed color becomes pale when viewed under an oblique angle. According to the present invention, the retardation of each domain of the liquid crystal cell is compensated with an in-cell optical compensation film with plural domains having a different alignment direction each other. The liquid crystal display of the present invention, employing such an in-cell optical compensation film, exhibits a small viewing angle dependence of image quality and a good display property in a white state.

Figure 6:
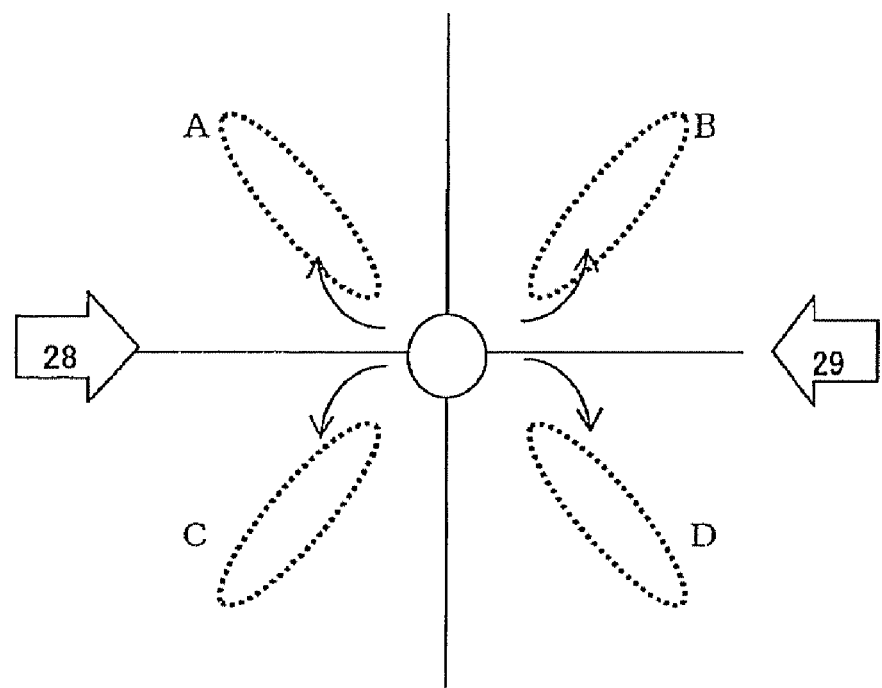
FIG. 6 is a schematic plan view showing constitution of an embodiment of a VA-mode liquid crystal display apparatus of the present invention.

FIG. 6 is a schematic plan view showing alignment directions in a pixel consisting of multi domains of a VA-mode cell. As shown in FIG. 6, the liquid crystal molecules are given oblique electric fields for example by slit electrodes and are tilted in four directions respectively in the domains A, B, C and D. The Re of the liquid crystal layer found in the domains A and C increases when viewed in a direction 28 and decreases when viewed in a direction 29. The viewing angle dependence of Re variation can be reduced by using an optically anisotropic layer which can optically compensate the Re increase both in the areas A and C when viewed in the direction 29.

For example, an optical compensation layer (20' in FIG. 1), with plural domains in which discotic molecules are aligned in a hybrid alignment state, may be disposed between the paired substrates (substrates 17, 19 in FIG. 1) sandwiching the liquid crystal layer for optical compensation of the domains A and C. In order to reduce the Re value of the liquid crystal layer when viewed in the oblique direction 29 and to decrease the Re difference between when viewed in the oblique direction 29 and in the vertical direction, such an optical compensation layer (20' in FIG. 1) may be disposed in the manner that its alignment controlling directions (for example rubbing direction controlling the alignment of discotic molecules) in the domains corresponding to A and C are parallel to the absorption axis (23 in FIG. 1) of the polarizing film (22 in FIG. 1). Further, in order to decrease the Re difference between when viewed in the oblique direction 28 and in the vertical direction and to improve in the viewing angle property, an optical compensation layer (20' in FIG. 1), for optical compensation of the domains B and D, in which discotic molecules are aligned in a hybrid alignment state with its alignment directions differing by 180° from those of the optical compensation layers for optical compensation of the domains A and C, may be disposed.

It is also possible to prepare an in-cell optical compensation film, comprising a common layer for optical compensation of all of the domains A to D, in which discotic molecules are aligned with their disc faces parallel to the substrate surface, and a layer formed of a composition containing at least one rod-like liquid crystal compound, in which rod-like molecules are aligned with an alignment direction in the domains corresponding to the domains A and C, and with a different alignment direction in the domains corresponding to the domains B and D.

Figure 7:
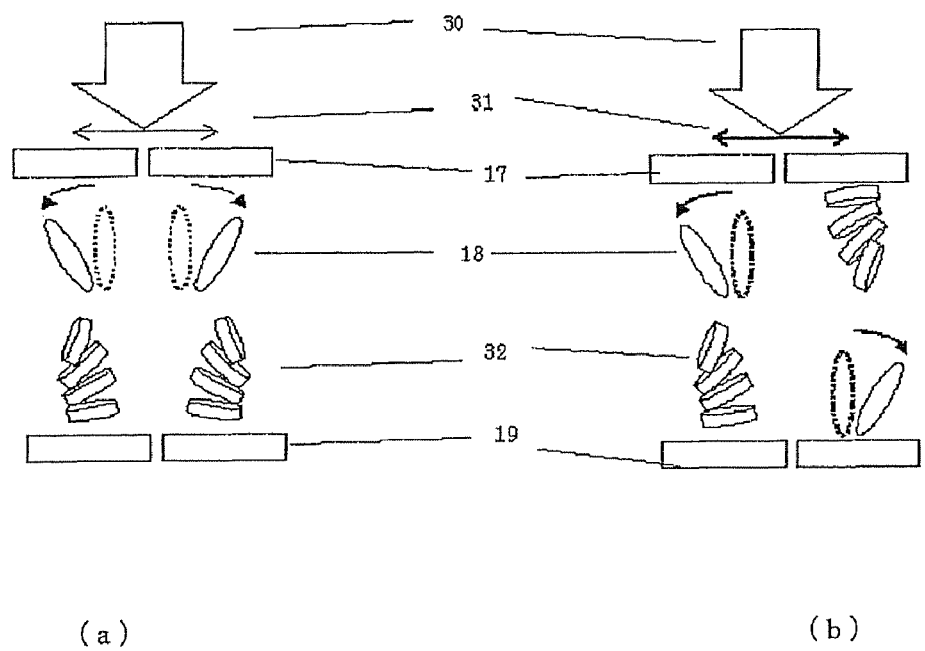
FIG. 7 is a schematic cross-sectional view showing constitution of an embodiment of a VA-mode liquid crystal display apparatus of the present invention.

FIG. 7(*a*) is schematic lateral view of a liquid crystal cell comprising an in-cell optical compensation film with plural domains, in which discotic molecules 32 are aligned with a different mean alignment direction in each domain, formed on the internal surface of a substrate 19, among the paired substrates 17, 19 constituting the liquid crystal cell. It is also possible, as shown in FIG. 7(*b*), to dispose in-cell optical compensation films on both the paired substrates 17, 19 of the liquid crystal cell, and to divide a region corresponding to a pixel into plural domains, at least one of which has the optical compensation film thereon and at least another of which has no optical compensation film thereon, in such a manner that the in-cell optical compensation films do not mutually overlap between the upper and lower substrates. The method of forming a part having the optical compensation film and a part not having the optical compensation film per a pixel is effective for a semi-transmission liquid crystal display apparatus mentioned above. Such display usually employs different thicknesses of the cell thickness in a reflective part and a transmission part with a pixel, and an optical compensation film disposed in the reflective part inside the substrates allows to physically reduce the cell thickness in such reflective part.

The optical compensation film employed in the invention as explained above has so-called multi-domain structure, having plural domains with different mean alignment directions. In the in-cell optical compensation film, the multi-domain structure is defined as a structure comprising at least two optically anisotropic domains formed by dividing a region corresponding to a pixel, wherein a mean alignment direction found in a domain is different from that found in another domain. The mean alignment direction means a mean direction of molecular symmetry axes of the molecules contained in the in-cell optical compensation film. It can be measured as an in-plane direction of an alignment axis, by an automatic birefringence meter (KOBRA 21DH, manufactured by Oji Keisoku Co.). Even when a same in-plane mean alignment direction is found in all domains, a multi-domain structure can be obtained in case a mean tilt angle with regard to the film surface in a domain is different from that found in other domain (for example, a structure comprising two domains having respectively a mean tilt angle of 45° and 30° rotating from the normal line to the film surface). The mean tilt angle of the alignment direction with regard to the film surface can be obtained by measuring a retardation of a sample placed obliquely, with an automatic birefringence meter (KOBRA 21DH, manufactured by Oji Keisoku Co.).

The in-cell optically anisotropic layer to be formed between the substrates (17, 19 in FIG. 1) may be formed of a composition comprising any compound selected from discotic compounds, rod-like compounds, liquid crystalline compounds or low-molecular or high-molecular liquid crystalline compounds.

The alignment direction in each domain of the multi-domain optical compensation film may be controlled by a rubbing process to be performed after forming an alignment layer, by a UV irradiation for photocuring or by an oblique laser irradiation. In the method of controlling the alignment direction in each domain of the multi-domain optical compensation film by rubbing process, the rubbing process may be carried out rubbing a region corresponding to a pixel while covering partially with a mask, thereby dividing the region into two or four domains so that a rubbing axis or a rubbing intensity found in a domain is different from that found in other domain. Also in the method of the controlling alignment direction in domain of the multi-domain optical compensation film by a UV light irradiation for photocuring, after applying a polymerizable liquid crystal composition to a surface to form a polymerizable layer, the photocuring step may be carried out irradiating the polymerizable layer with a polarized UV light or with a UV light from a light source capable of changing the irradiation intensity or the irradiating angle, thereby obtaining a retardation and an alignment direction different in each domains. Also in the method of controlling the alignment direction in each domain of the multi-domain optical compensation film by an oblique laser light irradiation, after applying a liquid crystal composition to a surface to form a liquid crystal layer, the oblique laser light irradiation may be carried out irradiating the liquid crystal layer with a laser light from a gas laser or a semiconductor laser to obtain an alignment direction in each domain, or, after applying a coating liquid to a surface to form a coating layer to be used for an alignment layer, irradiating the coating layer with a laser light to modify a direction or a magnitude of the tilt angle of the alignment film. And, after that, a coating liquid of a liquid crystal composition may be applied to the surface of the alignment layer and curing the composition to form an in-cell optical compensation film. It is also possible to utilize a patterning mask for light interception at the UV light irradiation thereby suppressing the curing of the optical compensation film, and to remove an uncured part after the UV irradiation, thereby forming a region with no or little retardation.

Also as to Re and Rth of the optical compensation layer, Re is preferably within a range of 5 to 100 nm and Rth is preferably within a range of 50 to 300 nm in case of VA, TN or OCB mode. It is possible to use an optical compensation film having Re and Rth outside such ranges in combination with a stretched polymer film disposed outside the substrates of the liquid crystal cell, with a protective film of a polarizing film with a retardation, or with a protective film of a polarizing film having a coating-type compensation layer thereon. Thus, all of the optical compensation layers included in the liquid crystal display apparatus preferably have a total Re within a range of 20 to 70 nm and a total Rth within a range of 70 to 200 nm. Also in case of employing the above-described display mode in the transmission IPS mode or in the reflective display apparatus, Re and Rth may be selected within respective ranges of 100 to 300 nm and −150 to 150 nm.

The in-cell optical compensation film can be function as an alignment film for the liquid crystal layer, an electrode insulation film, a polarizing film or a luminance improving film. Also a transparent electrode, an electrode insulation film, or an alignment film may be disposed between the in-cell optical compensation film and the liquid crystal layer.

In the present invention, at least an optical compensation film is provided between a pair of substrates constituting the liquid crystal cell (in the present description, an optical compensation film positioned inside the substrates of the liquid crystal cell being called am "in-cell optical compensation film"). The in-cell optical compensation film is only required to be provided between the paired substrate, and may be provided on an internal surface of one of the paired substrates, or may be formed on internal surfaces of both substrates.

The optical compensation film mentioned above comprises, in a region corresponding to a pixel of the liquid crystal cell, plural domains in which the molecules in the film have mutually different mean alignment directions. However, as shown in FIG. 7(b), the domains having mutually different mean alignment directions need not be on a same plane.

The in-cell optical compensation film preferably comprises at least an optically anisotropic layer formed of a composition containing at least one type of liquid crystalline compound. In the following, the in-cell optical compensation film, comprising at least an optically anisotropic layer formed of a composition containing at least one type of liquid crystalline compound, will be explained in detail.

<<Alignment Film for Optical Compensation Film>>

In the in-cell optical compensation film, the molecules of liquid crystalline compound are subjected to an alignment control and fixed in such state. An alignment control of the molecules of liquid crystalline compound can be achieved, for example, by a rubbing method on an alignment film formed between the optically anisotropic layer and the substrate. However the present invention is not limited to such rubbing method, and any method capable of achieving an alignment control of the liquid crystalline compound may be employed. It is also possible to form multiple domains of the in-cell optical compensation film, for example by a masked rubbing, by changing a rubbing direction or a rubbing intensity within a pixel of the liquid crystal display apparatus.

The alignment film has a function of defining the alignment direction of the liquid crystalline compound, and, therefore, the alignment layer is preferably used for carrying out the preferred embodiment of the invention. However, when the liquid crystalline compound is fixed, after alignment thereof, in such aligned state, the alignment film has completed its function and is no longer a necessary component for carrying out the invention. Stated differently, it is also possible to transfer an optically anisotropic layer only with a fixed alignment state, onto a substrate for supporting the liquid crystal layer.

The alignment film can be formed by rubbing a surface of an organic compound (preferably a polymer) layer, an oblique evaporation of an inorganic compound, formation of a layer having microgrooves, or lamination of Langmuir-Blodgett films of an organic compound (such as ω-trocosanic acid, dioctadecylmethylammonium chloride, or methyl stearate). Also an alignment film generating an aligning function by an electric field, a magnetic field or a light irradiation is known.

The alignment film is preferably formed by rubbing a surface of a polymer layer. The polymer to be employed in the alignment film generally has a molecular structure having a function of aligning liquid crystalline molecules.

In the present invention, it preferably has, in addition to the function of aligning the liquid crystalline compound, a side chain, having a crosslinking functional group (such as a double bond), connected to a main chain, or a crosslinking functional group, capable of aligning the liquid crystalline molecules, in a side chain. The polymer to be employed in the alignment film may be a polymer capable of crosslinking by itself, or a polymer capable of crosslinking by a crosslinking agent, or a combination of plurality thereof. Examples of such polymer include a methacrylate copolymer, a styrenic copolymer, polyolefin, polyvinyl alcohol, denatured polyvinyl alcohol, poly(N-methylolacrylamide), polyester, polyimide, a vinyl acetate copolymer, carboxymethyl cellulose and polycarbonate, described for example in JPA No. hei 8-338913, paragraph [0022]. Also a silane coupling agent may be employed as the polymer. A water-soluable polymer (such as poly(N-methylolacrylamide), carboxymethyl cellulose, gelatin, polyvinyl alcohol or denatured polyvinyl alcohol) is preferable, gelatin, polyvinyl alcohol or denatured polyvinyl alcohol is more preferable, and polyvinyl alcohol or denatured polyvinyl alcohol is most preferable. It is particularly preferable to two types of polyvinyl alcohol or denatured polyvinyl alcohol with different degrees of polymerization.

Polyvinyl alcohol preferably has a saponification degree of 70 to 100%, and more preferably 80 to 100%. Polyvinyl alcohol preferably has a polymerization degree of 100 to 5,000.

A side chain, having a function of aligning the liquid crystalline molecules, generally has a hydrophobic group as a functional group. Specific type of the functional group is determined according to the type of the liquid crystalline molecule and the required alignment state. For example, a denaturing group for denatured polyvinyl alcohol can be introduced by a copolymerization denaturing, a chain transfer denaturing or a block polymerization denaturing. Examples of the denaturing group include a hydrophilic group (such as a carboxylic acid group, a sulfonic acid group, a phosphonic acid group, an amino group, an ammonium group, an amide group or a thiol group), a hydrocarbon group with 10 to 100 carbon atoms, a fluorine-substituted hydrocarbon group, a thioether group, a polymerizable group (such as an unsaturated polymerizable group, an epoxy group, or an aziridinyl group), and an alkoxysilyl group (such as trialkoxy, dialkoxy or trialkoxy). Specific examples of such denatured polyvinyl alcohol compound include those described in JPA No. 2000-155216, paragraphs [0022] to [0145], and JPA No. 2002-62426, paragraphs [0018] to [0022].

By bonding a side chain having a crosslinking functional group to a main chain of the alignment film polymer, or by introducing a crosslinking functional group into a side chain having a function of aligning the liquid crystalline molecule, the polymer of the alignment film may be copolymerized with a polyfunctional monomer contained in the optically anisotropic layer. As a result, a firm bond by covalent bonds can be realized not only between the polyfunctional monomers, but also between the polymers of the alignment film and between the polyfunctional monomer and the polymer of the alignment film. Thus, the introduction of the crosslinking function group into the polymer of the alignment film allows to significantly improve the strength of the optical compensation film.

The crosslinking functional group of the polymer of the alignment film preferably contains a polymerizable group, as in the case of the polyfunctional monomer. Specific examples include those for example described in JPA No. 2000-155216, paragraphs [0080] to [0100].

The polymer of the alignment film may be crosslinked with a crosslinking agent, instead of the crosslinking functional group mentioned above. The crosslinking agent can be, for example, an aldehyde, an N-methylol compound, a dioxane derivative, a compound rendered active by activating a carboxyl group, an active vinyl compound, an active halogen compound, isooxazol and dialdehyde starch. It is also possible to use two or more crosslinking agents in combination. Specific examples include for example compounds described in JPA No. 2002-62426, paragraphs [0023] to [0024]. An aldehyde with a high reaction activity, particularly glutaraldehyde, is preferred.

An amount of the crosslinking agent is preferably 0.1 to 20 mass % with respect to the polymer, more preferably 0.5 to 15 mass %. An amount of the unreacted crosslinking agent remaining in the alignment film is preferably 1.0 mass % or less, more preferably 0.5 mass % or less. Such amount provides a sufficient durability without generation of reticulations, when the alignment film is assembled in a liquid crystal display apparatus and used for a long time or let to stand for a prolonged period in an environment of high temperature and high humidity.

The alignment film can be formed basically by an alignment film forming material, containing the polymer and the crosslinking agent mentioned above, on a transparent substrate, and then executing a drying under heating (crosslinking) and a rubbing process. The crosslinking operation may be executed at an arbitrary timing after coating on the transparent substrate as explained above. In case of employing a water-soluble polymer such as polyvinyl alcohol as the material for forming the alignment film, the coating liquid is preferably prepared with a mixed solvent of an organic solvent with a defoaming function (such as methanol) and water. A mass ratio of water:methanol is preferably 0:100 to 99:1, and more preferably 0:100 to 91:9. In this manner, bubble generation can be suppressed to significantly reduce surface defects on the alignment film, and also on the optically anisotropic layer.

The alignment film is preferably coated by a spin coating method, a dip coating method, a curtain coating method, an extrusion coating method, a rod coating method or a roll coating method, particularly a rod coating method. The film thickness after drying is preferably 0.1 to 10 µm. The drying under heating can be executed at 20 to 110° C., and, for achieving a sufficient crosslinking, it is preferably executed at 60 to 100° C. and particularly preferably at 80 to 100° C. The drying can be executed in a time of 1 minute to 36 hours, preferably 1 to 30 minutes.

A pH value is preferably adjusted at a value optimum for the crosslinking agent to be employed, and, in case of employing glutaraldehyde, a pH value of 4.5 to 5.5, particularly 5, is preferred.

The alignment film is formed on a transparent substrate or on an undercoat layer. The alignment film can be obtained, after crosslinking the polymer layer as explained above, by executing a rubbing process on the surface.

The rubbing process may be executed by a process widely employed in a liquid crystal aligning process in LCD. More specifically, an alignment is obtained by rubbing the surface of the alignment film in a predetermined direction with paper, gauze, felt, rubber, nylon or polyester fibers. In general, it is executed by several rubbing strokes, with a cloth uniformly having fibers of uniform length and thickness.

Then the alignment film is utilized to align the liquid crystalline molecules of the optically anisotropic layer formed thereon. Thereafter, if necessary, the polymer of the alignment film is reacted with the polyfunctional monomer contained in the optically anisotropic layer or the crosslinking agent is used to crosslink the polymer of the alignment film.

The alignment film has a thickness preferably within a range of 0.1 to 10 µm.

<<Optically Anisotropic Layer>>

The preferred embodiments of the optically anisotropic layer formed of a liquid crystal composition will be described in detail. The optically anisotropic layer comprises liquid crystal molecules which are controlled their alignments by an alignment axis such as a rubbing axis and are fixed in such an alignment sate.

Examples of the liquid crystalline compound employed in preparation of the optically anisotropic layer include rod-like and discotic liquid crystalline compounds. The liquid crystalline compound may be selected form high-molecular weight or low-molecular weight liquid crystalline materials. It is to be noted that, after being fixed by cross-linking or the like in an alignment state, the liquid crystalline compound is not required to exhibit liquid crystallinity. The alignment state of rod-like or discotic liquid crystalline molecules, which is defined with an angle between a long axis of rod-like or discotic liquid crystalline molecule and a layer plane, is not to be limited, and any alignment state such as a horizontal (homogeneous) alignment state, a vertical alignment state or uniformly tilted alignment state may be employed. Using rod-like liquid crystalline compounds, it is preferred that the rod-like molecules are aligned so that the mean direction of the projected axes of the long axes of rod-like liquid crystalline molecules to a layer plane is parallel to an alignment axis. And, using discotic liquid crystalline compounds, it is preferred that the discotic molecules are aligned so that the mean direction of the projected axes of the short axes of discotic liquid crystalline molecules to a layer plane is parallel to an alignment axis. The hybrid alignment state, in which the angle (tilt angle) between liquid crystalline molecules and a layer plane is varied along with the thickness direction, described later, and uniformly tilted alignment state, are preferably employed.

<<Rod-Like Liquid Crystalline Compound>>

Examples of the rod-like liquid-crystalline compound include azomethine compounds, azoxy compounds, cyanobiphenyl compounds, cyanophenyl esters, benzoate esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds and alkenylcyclohexylbenzonitrile compounds. Examples of the rod-like liquid crystal compounds further include metal complexes of liquid crystal compounds. Liquid crystal polymers having one or more repeating units including a rod-like liquid crystal structure can also be used in the present invention. Namely, the rod-like crystal compounds bonded to a polymer may be use in the present invention.

Rod-like liquid crystal compounds are described in fourth, seventh and eleventh chapters of "Published Quarterly Chemical Review vol. 22 Chemistry of Liquid Crystals (Ekisho no Kagaku)" published in 1994 and edited by Japan Chemical Society; and in third chapter of "Handbook of liquid Crystal Devices (Ekisyo Debaisu Handobukku)" edited by the 142 th committee of Japan Society for the Promotion of Science.

The rod-like crystal compounds desirably have a birefringence index of 0.001 to 0.7.

The rod-like crystal compounds desirably have one or more polymerizable groups for fixing themselves in an alignment state. Preferred examples of the polymerizable group include unsaturated groups capable of radical polymerization and groups capable of cationic polymerization. More specifically, polymerizable groups and polymerizable liquid crystalline compounds, described in columns from [0064] to [0086] of JPA No. 2002-62427, are preferably used in the present invention.

<<Discotic Liquid Crystalline Compound>>

Examples of discotic liquid-crystal compounds include benzene derivatives described in "Mol. Cryst.", vol. 71, page 111 (1981), C. Destrade et al; truxane derivatives described in "Mol. Cryst.", vol. 122, page 141 (1985), C. Destrade et al. and "Physics lett. A", vol. 78, page 82 (1990); cyclohexane derivatives described in "Angew. Chem.", vol. 96, page 70 (1984), B. Kohne et al.; and macrocycles based aza-crowns or phenyl acetylenes described in "J. Chem. Commun.", page 1794 (1985), M. Lehn et al. and "J. Am. Chem. Soc.", vol. 116, page 2,655 (1994), J. Zhang et al.

Examples of the discotic liquid crystal compounds also include compounds having a discotic core and substituents, radiating from the core, such as a linear alkyl or alkoxy group or substituted benzoyloxy groups. Such compounds exhibit liquid crystallinity. It is preferred that molecules have rotational symmetries respectively or as a whole of molecular assembly to be aligned in an alignment state.

The discotic liquid crystal compounds employed in preparing optically anisotropic layers are not required to maintain liquid crystallinity after contained in the optically anisotropic layers. For example, when a low-molecular-weight discotic liquid crystal compound, having a reacting group initiated by light and/or heat, is employed in preparation of an optically anisotropic layer, polymerization or cross-linking reaction of the compound is initiated by light and/or heat, and carried out, to thereby form the layer. The polymerized or cross-linked compounds may no longer exhibit liquid crystallinity. Preferred examples of the discotic liquid crystal compound are described in JPA No. hei 8-50206. The polymerization of discotic liquid-crystal compounds is described in JPA No. hei 8-27284.

In order to fix the discotic liquid crystalline molecule by a polymerization, a polymerizable group has to be bonded as a substituent to a disk-shaped core of the discotic liquid crystalline molecule. In a preferred compound, the disk-shaped core and the polymerizable group are preferably bonded through a linking group, whereby the aligned state can be maintained in the polymerization reaction. Examples of such compound are described for example in JPA No. 2000-155216, paragraphs [0151] to [0168].

In a hybrid alignment, an angle between the disc face of the liquid crystalline molecule or a molecular symmetry axis of the rod-like liquid crystalline molecule and the layer plane increases or decreases in the thickness direction of the optically anisotropic layer, along with an increase in the distance from the surface of the substrate (or the alignment layer). The tilt angle preferably increases along with the increase in the distance. Also the change in the tilt angle may be a continuous increase, a continuous decreases, an intermittent increase, an intermittent decrease, a change including a continuous increase and a continuous decrease, or an intermittent change including an increase and a decrease. The intermittent change contains a region in which the tilt angle does not change, within the thickness direction. Also the angular change may be a general increase or a general decrease over the thickness, even including a region without angular change. Also, a continuous angular change is preferable. Also a uniformly tilted alignment is naturally acceptable.

<<Other Additives in Optically Anisotropic Layer>>

Together with the liquid crystalline compound, a plasticizer, a surfactant or a polymerizable monomer may be employed to improve the uniformity of the coated film, the film strength, the alignment property of the liquid crystalline molecules and the like. Such additive preferably has a compatibility with the liquid crystalline molecules and has a property of changing the tilt angle thereof or of not inhibiting the alignment thereof.

The polymerizable monomer may be selected from compounds capable of radical polymerization or cationic polymerization. A polyfunctional radical polymerizable monomers are preferred, more preferably capable of copolymerization with the liquid crystalline compound having the aforementioned polymerizable group. Examples are described, for example, in JPA No. 2002-296423, paragraphs [0018] to [0020]. An amount of such compound is generally within a range of 1 to 50 mass % with respect to the liquid crystalline compound, preferably 5 to 30 mass %.

The surfactant may be selected from known surfactants, and preferably selected from fluorinated compounds. Specific examples are compounds described in JPA No. 2001-330725, paragraphs [0028] to [0056].

The polymer to be employed with the discotic liquid crystalline compound is preferably capable of causing a change in the tilt angle thereof.

The polymer may be selected from cellulose esters. Preferred examples of the cellulose ester are described in JPA No. 2000-155216, paragraph [0178]. In order not to hinder the alignment of the liquid crystalline molecules, the polymer is added preferably with an amount of 0.1 to 10 mass % with respect to the liquid crystalline compound, more preferably 0.1 to 8 mass %.

It is preferred that the discotic liquid crystalline molecules has a transition temperature between the discotic liquid crystalline phase and the solid phase within a range of 70 to 300° C., more preferably 70 to 170° C.

<<Preparation of Optically Anisotropic Layer>>

The optically anisotropic layer may be formed by applying a coating liquid, containing a liquid-crystalline compound and, if necessary, a polymerization initiator as described below or other additives, to a surface of an alignment layer.

The solvent used for preparing the coating liquid is preferably an organic solvent. Examples of organic solvents include amides (e.g., N,N-dimethyl formamide), sulfoxides (e.g., dimethyl sulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents may be used in combination.

The coating liquid can be applied by known techniques such as a wire-bar coating method, an extrusion coating method, a direct gravure coating method, a reverse gravure coating method and a die coating method The thickness of the optically anisotropic layer is preferably from 0.1 to 20 µm, and more preferably from 0.5 to 15 µm, and much more preferably from 0.7 to 10 µm.

<<Fixing of Liquid-Crystalline Molecules in an Alignment State>>

After being aligned in an alignment state, the liquid crystalline molecules may be fixed in the alignment state without disordering the state. Fixing is preferably carried out by the polymerization reaction of the polymerizable groups contained in the liquid-crystalline molecules. The polymerization reaction includes thermal polymerization reaction using a thermal polymerization initiator and photo-polymerization reaction using a photo-polymerization initiator. Photo-polymerization reaction is preferred. Examples of photo-polymerization initiators include alpha-carbonyl compounds (described in U.S. Pat. Nos. 2,367,661 and 2,367,670), acyloin ethers (described in U.S. Pat. No. 2,448,828), alpha-hydrocarbon-substituted aromatic acyloin compounds (described in U.S. Pat. No. 2,722,512), polynuclear quinone compounds (described in U.S. Pat. Nos. 3,046,127 and 2,951,758), combinations of triarylimidazole dimers and p-aminophenyl ketone (described in U.S. Pat. No. 3,549,367), acridine and phenazine compounds (described in Japanese Laid-Open Patent Publication (Tokkai) syo No. 60-105667 and U.S. Pat. No. 4,239,850) and oxadiazole compounds (described in U.S. Pat. No. 4,212,970).

The amount of the photo-polymerization initiators to be used is preferably 0.01 to 20 mass %, more preferably 0.5 to 5 mass % on the basis of solids in the coating liquid.

Irradiation for polymerizing the liquid-crystalline molecules preferably uses UV rays. The irradiation energy is preferably 20 mJ/cm$^2$ to 50 J/cm$^2$, more preferably 20 to 5000 mJ/cm$^2$ and much more preferably 100 to 800 mJ/cm$^2$. Irradiation may be carried out under heating to accelerate the photo-polymerization reaction.

<<Method for Dividing into Plural Domains>>

The optically anisotropic layer, disposed between the substrates for the liquid crystal layer, may be formed by dividing a region corresponding to a pixel into plural domains, by a masked rubbing process. In this process, after forming a layer to be used as an alignment layer, a rubbing process is carried out while covering a half portion of a region corresponding to a pixel with a metal mask formed by stainless steel or chromium. Then the mask is displaced to cover the already rubbed region, and a rubbing process is carried out in a direction opposite to the first rubbing process. Forming the optically anisotropic layer on the alignment layer prepared according to this process, the region corresponding to a pixel, of the optically anisotropic layer, can be divided into two domains, with different alignment directions. A division into four or eight domains is also possible by changing the area covered with a mask in each rubbing step. Also the above-described process may be used to form and solidify an optically anisotropic layer, thereby obtaining an optically anisotropic layer having plural aligned domains within a pixel. Naturally, the alignment direction may also be controlled by various methods mentioned in the foregoing, other than the alignment control by rubbing.

In the liquid crystal display apparatus of the invention, in addition to the in-cell optical compensation film, the above-mentioned optically anisotropic layer may be formed on a substrate of a polymer film and used as an external optical compensation film. Also an optically anisotropic film may be formed on another substrate and utilized as an external optical compensation film. Such external optical compensation film may function also as a protective film for the polarizing film.

In the following, with respect to various members usable in the liquid crystal display apparatus of the invention, material and producing method thereof will be explained in detail.

[Optical Compensation Film Disposed Outside Liquid Crystal Cell]

In the invention, in addition to the in-cell optical compensation film, an optical compensation film may be disposed outside the liquid crystal cell (hereinafter, an liquid crystal disposed outside the liquid crystal cell may be also called "external optical compensation film"). The optical compensation film contributes to an improvement in the viewing angle-dependent contrast change and a reduction in the viewing angle-dependent color aberration. In the invention, the external optical compensation film may be disposed between the liquid crystal cell and the polarizing plate at the observing side, or between the liquid crystal cell and the polarizing plate at the rear side, or in both. It may be assembled as an independent member into the liquid crystal display apparatus, or a protective film (substrate) of the polarizing film may be given the aforementioned optical characteristics to function as an optical compensation film, which may be incorporated as a part of the polarizing plate into the liquid crystal display apparatus.

In the invention, the external optical compensation film is not particularly limited in its material. For example, it may be a stretched birefringent polymer film, or an optically anisotropic layer formed by fixing a liquid crystalline composition in an alignment state. Also the optical compensation film is not limited to a single-layered structure, but may have a laminated structure of plural layers. In such laminated structure, materials constituting different layers may be different, and it can be a laminate member formed by a polymer film and an optically anisotropic layer of a liquid crystalline compound. In a laminate structure, in consideration of the thickness, a coating-type laminate member including a layer formed by coating is preferable to a laminate member of stretched polymer films.

In case of employing a liquid crystalline compound for preparing the external optical compensation film, since the liquid crystalline compound can assume various alignment states, the optically anisotropic film prepared by fixing the liquid crystalline molecules in a specified alignment state can exhibit a desired optical property by a single layer or by a laminate member of plural layers. Therefore, the optical compensation film may have a form constituted of a substrate and one or more optically anisotropic layers formed on such substrate. A retardation of the entire optical compensation film of such form can be regulated by an optical anisotropy of the optically anisotropic layer. The liquid crystalline compound can be classified, by a molecular shape thereof, into a rod-like liquid crystalline compound and a discotic liquid crystalline compound. Each further includes a low molecular type and a high molecular type, both of which are usable. In case of employing a liquid crystalline compound for preparing the optical compensation film, it is preferable to employ a rod-like liquid crystalline compound or a discotic liquid crystalline compound, and more preferable to employ a rod-like liquid crystalline compound having a polymerizable group or a discotic liquid crystalline compound having a polymerizable group.

Also the optical compensation film may be selected form polymer films. The polymer film may be stretched polymer film, or a combination of a coated polymer layer and a polymer film. The polymer film is generally formed from a synthetic polymer (such as polycarbonate, polyester, polyethersulfone, polyacrylate, polymethacrylate, norbornene resin or triacetyl cellulose). Also preferred is a cellulose acylate film, formed of a composition of cellulose acylate, added with a rod-like compound having an aromatic ring (specifically an aromatic compound having two aromatic rings). A polymer film having desired optical characteristics can be prepared by regulating type and amount of the aromatic compound, and stretching conditions for the film.

<<Substrate>>

The external optical compensation film may also be used as the protective film (substrate) of the polarizing film. Also in addition to the protective film, a film may be provided as a substrate. The substrate may be provided in any position between the polarizing film and the liquid crystal layer. The substrate is preferably glass or a transparent polymer film. The substrate preferably has an optical transmittance of 80% or higher. In case of employing glass as the substrate, it may also serve as the substrate for supporting the liquid crystal layer. Examples of the polymer constituting the polymer film include a cellulose ester (such as cellulose mono- to tri-acylate), a norbornene polymer and polymethyl methacrylate. Also a commercially available polymer may be employed (such as Arton or Zeonex (trade names) in norbornene polymer). Also a known polymer easily exhibiting birefringence, such as polycarbonate or polysulfone, is preferably used with a suppression of birefringence, by a molecular modification as described in WO00/26705 pamphlet.

Among these, a cellulose ester is preferable, and a lower fatty acid ester of cellulose is more preferable. A lower fatty acid means a fatty acid with 6 or less carbon atoms. A cellulose acylate with 2 to 4 carbon atoms is more preferable, and cellulose acetate is particularly preferable. Also a mixed fatty acid ester, such as cellulose acetate propionate or cellulose acetate butyrate, may also be employed. Cellulose acetate preferably has a viscosity-average polymerization degree (DP) of 250 or higher, and more preferably 290 or higher. Also cellulose acetate preferably has a narrow molecular weight distribution Mw/Wn (Mw: weight-average molecular weight, Mn: number-average molecular weight). Specific Mw/Wn value is preferably 1.0 to 1.7, more preferably 1.0 to 1.65.

The polymer film is preferably cellulose acetate with an acetylation degree of 55.0 to 62.5%, more preferably 57.0 to 62.0%. The acetylation degree means an amount of acetic acid bonded per unit mass of cellulose, and can be determined by measurement and calculation according to ASTM D-817-91 (testing method for cellulose acetate etc.).

Cellulose acetate do not show equal hydroxyl substitutions in 2-, 3- and 6-positions but tends to show a lower substitution degree in the 6-position. The polymer film to be employed in the invention preferably has a substitution degree in 6-position, comparable to or larger than that in 2- and 3-positions. A proportion of substitution degree in 6-position with respect to the total substitution degree in 2-, 3- and 6-positions is preferably 30 to 40%, more preferably 31 to 40% and most preferably 32 to 40%. The substitution degree in 6-position is preferably 0.88 or higher.

A method of synthesizing such acyl groups and cellulose acylate is described in detail in Japan Institute of Invention and Innovation, Journal of Technical Disclosure No. 2001-1745 (Mar. 15, 2001), page 9.

The retardation of the polymer film has different preferable range, depending on the liquid crystal layer on which the optical compensation film is used and the method of use thereof, but the retardation Re is preferably within a range of 0 to 200 nm, and the retardation Rth is preferably within a range of 70 to 400 nm. In case of employing two optically anisotropic layers in the liquid crystal display apparatus, the polymer film preferably has a retardation Rth within a range of 70 to 250 nm. In case of employing one optically anisotropic layer in the liquid crystal display apparatus, the base film preferably has a retardation Rth within a range of 150 to 400 nm.

Also the base film preferably has a birefringence rate ($\Delta n$: nx−ny) within a range of 0.00028 to 0.020. Also the cellulose acetate film preferably has a birefringence rate in thickness direction ((nx+ny)/2−nz) within a range of 0.001 to 0.04.

Regulation of retardation in a polymer film is usually executed by an external force application such as a stretching, but a retardation elevating agent for regulating the optical anisotropy may also be added. For regulating retardation of a cellulose acylate film, an aromatic compound having at least two aromatic rings is preferably employed as the retardation elevating agent. The aromatic compound is preferably employed within a range of 0.01 to 20 parts by mass with respect to 100 parts by mass of cellulose acylate. Also two or more aromatic compounds may be employed in combination. The aromatic ring of the aromatic compound includes an aromatic hydrocarbon ring and an aromatic heterocycle. Specific examples include compounds described EP-A-911656, JPA No. 2000-111914 and JPA No. 200-275434.

Further, the cellulose acetate film employed in the external optical compensation film preferably has a moisture-absorption expansion coefficient of $30 \times 10^{-5}$/% RH or less, more preferably $15 \times 10^{-5}$/% RH or less, and most preferably $10 \times 10^{-5}$/% RH or less. The moisture-absorption expansion coefficient is preferably smaller, but is normally $1.0 \times 10^{-5}$/% RH or larger. The moisture-absorption expansion coefficient indicates a change in the length of specimen, when the relative humidity is changed under a constant temperature. Regulation of the moisture-absorption expansion coefficient allows to prevent a frame-shaped increase in transmittance (light leakage by strain), while maintaining the optical compensating ability of the optical compensation sheet.

The moisture-absorption expansion coefficient was measured by a following method. A specimen of a width of 5 mm and a length of 20 mm was cut out from a prepared polymer film, and was suspended by fixing an end in an environment of 25° C., 20% RH ($R_0$). A weight of 0.5 g was suspended on the other end and, after 10 minutes, a length ($L_0$) was measured. Then the humidity was changed to 80% RH ($R_2$) at the same temperature of 25° C. and a length ($L_1$) was measured. The moisture-absorption expansion coefficient was calculated by a following equation. The measurement was conducted on 10 specimens prepared from a same sample film, and an average value of the results was adopted.

moisture-absorption expansion coefficient [/% RH]=$\{(L_1-L_0)/L_0\}/(R_1-R_0)$

In order to reduce the dimensional change by moisture absorption, it is preferable to add a compound having a hydrophobic group or fine particles. The compound having hydrophobic group is preferably a material meeting such requirement within the plasticizer or the anti-deterioration agent having a hydrophobic group such as an aliphatic group or an aromatic group in the molecule. Such compound is preferably added within a range of 0.01 to 10 mass % with respect to a solution (dope) to be prepared. Also a free volume in the polymer film is preferably made smaller for this purpose, and a smaller free volume is attained by reducing a residual solvent at the film formation by a solvent cast method to be explained later. The cellulose acetate film is preferably dried under such condition as to provide a residual solvent amount of 0.01 to 1.00 mass %.

The aforementioned additive added to the polymer film or the additives that can be added for various purposes (for example an ultraviolet absorber, a releasing agent, an antistatic, an anti-deterioration agent (such as antioxidant, peroxide decomposer, radical inhibitor, metal deactivator, acid trap agent or amine), or an infrared absorber) may be a solid or an oily substance. In case where a film is formed by multiple layers, the kind of additive and an amount of additive may be different in each layer. Preferred materials are described in detail in the aforementioned Journal of Technical Disclosure No. 2001-1745, p. 16 to 22. An amount of such additive is not particularly restricted as long as the function thereof can be exhibited, but is preferably employed within a range of 0.001 to 25 mass % with respect to the entire composition of polymer film.

<<Producing Method of Polymer Film (Substrate)>>

The polymer film is preferably produced by a solvent cast method. In the solvent cast method, the film is produced by a solution (dope) prepared by dissolving a polymer material in an organic solvent. The dope is cast on a drum or a band and the solvent is evaporated to form a film. The dope before casting is preferably subjected to a concentration adjustment so as to obtain a solid content of 18 to 35%. The drum or the band preferably has a mirror-finished surface.

The dope is preferably cast on a drum or a band of a surface temperature of 10° C. or lower. After the casting, a drying with air blowing for 2 seconds or longer is preferably executed. The obtained film can be peeled off from the drum or the band and dried with hot air of successively different temperatures from 100 to 160° C. for evaporating the residual solvent. Such process is described in the aforementioned JPB No. hei 5-17844. This process allows to shorten the time from casting to peeling. For executing this process, the dope has to gel at the surface temperature of the drum or the band at the casting.

In the casting step, one cellulose acylate solution may be cast in a single layer, or two or more cellulose acylate solutions may be co-cast simultaneously or in succession.

Such method of co-casting plural cellulose acylate solutions in two or more layers includes a method of casting solutions, containing cellulose acylate, from plural casting slots provided along the advancing direction of the substrate to obtain laminated layers (for example described in JPA No. hei 11-198285), a method of casting cellulose acylate solutions from two casting slots (described in JPA No. hei 6-134933) and a method of enclosing a flow of a high-viscosity cellulose acylate solution in a low-viscosity cellulose acylate solution and simultaneously extruding both cellulose acylate solutions (described in JPA No. syo 56-162617), but the present invention is not limited to these methods. Such producing step by the solvent cast method is described in the aforementioned Journal of Technical Disclosure No. 2001-1745, p. 22 to 30, under items of dissolution, casting (including co-casting), metal support, drying, peeling and stretching.

The film (substrate) in the invention preferably has a thickness of 15 to 120 μm, more preferably 30 to 80 μm.

<<Elliptically Polarizing Plate>>

The present invention may employ an elliptically polarizing plate integrating the optically anisotropic layer with a linear polarizing film. The elliptically polarizing plate is preferably formed in a shape substantially same as that of the paired substrates constituting the liquid crystal cell, in order to be readily incorporated in the liquid crystal display apparatus (for example, in case of a rectangular liquid crystal cell, the elliptically polarizing plate is preferably formed into a same rectangular shape).

The elliptically polarizing plate can be prepared by laminating an external optical compensation film and a linear polarizing film (hereinafter, "polarizing film" used singly means "linear polarizing film"). The external optical compensation film may also function as a protective film for the linear polarizing film. Also the optical compensation layer disposed between the substrates may naturally be formed as a linear polarizing film by a dye addition.

The linear polarizing film is preferably a coated polarizing film as represented by a product of Optiva Inc., or a polarizing film formed by a binder and iodine or a dichroic dye. In the linear polarizing film, iodine or dichroic dye is aligned in the binder to exhibit a polarizing ability. The iodine or dichroic dye is preferably aligned along the binder molecules, or by an auto-texturing as in liquid crystal. The currently available commercial polarizer is generally prepared by immersing a stretched polymer film in a solution of iodine or a dichroic dye in a bath, thereby penetrating iodine or dichroic dye into the binder.

In the commercially available polarizing film, iodine or dichroic dye is distributed over about 4 μm from the polymer surface (about 8 μm in both sides), and a thickness of at least 10 μm is required for obtaining a sufficient polarizing ability. The level of penetration can be controlled by a concentration of iodine or dichroic dye in the solution, a temperature and an immersion time in the bath. A lower limit of the thickness of the binder is preferably 10 μm as described above. As to an upper limit, the binder thickness is preferably as small as possible in consideration of the light leak in the liquid crystal display apparatus. The thickness is preferably equal to or less than that of the current commercial polarizing plate (about 30 μm), more preferably 25 μm or less and further preferably 20 μm or less. With a thickness of 20 μm or less, the light leak is no longer observed in a 17-inch liquid crystal display apparatus.

The binder of the polarizing film may be crosslinked. The crosslinked binder may be obtained from a polymer which is crosslinkable by itself. The polarizing film may be formed by employing a binder constituted of a polymer having functional groups, or a binder obtained by introducing functional groups into a polymer, and by causing a reaction among such binder, by light, heat or pH change. Also a crosslinked structure may be introduced by a crosslinking agent into the polymer. The crosslinking can generally be executed, after coating a liquid containing polymer or a mixture of polymer and a crosslinking agent on a transparent substrate, by executing a heating. The crosslinking process may be executed in any step before obtaining the final polarizing plate, in order to secure the durability in such final product.

The binder of the polarizing film can be a polymer which is crosslinkable by itself, or a polymer which can be crosslinked by a crosslinking agent. Examples of such polymer are similar to those of the polymer described for the alignment film. Polyvinyl alcohol and denatured polyvinyl alcohol are most preferred. The denatured polyvinyl alcohol is described in JPA Nos. 8-338913, 9-152509 and 9-316127. Polyvinyl alcohol or denatured polyvinyl alcohol may be used in a combination of two or more kinds.

The crosslinking agent for the binder is preferably employed in an amount of 0.1 to 20 mass % with respect to the binder. Such amount can improve an alignment property of the polarizing element, and heat and moisture resistances of the polarizing film.

The alignment film contains, even after the crosslinking reaction, a certain amount of the crosslinking agent that has not been reacted. An amount of such residual crosslinking agent is preferably 1.0 mass % or less in the alignment film, more preferably 0.5 mass % or less. In this manner, the polarizing film does not lose the polarization degree when it is assembled in a liquid crystal display apparatus and used for a long time or let to stand for a prolonged period in an environment of high temperature and high humidity.

The crosslinking agent is described for example in U.S. Re-issued Pat. No. 23,297. Also a boron compound (such as boric acid or borax) may be employed as the crosslinking agent.

The dichroic dye can be an azo dye, a stilbene dye, a pyrazolone dye, a triphenylmethane dye, a quinoline dye, an oxazine dye, a thiazine dye or an anthraquinone dye. The dichroic dye is preferably water-soluble. Also the dichroic dye preferably has a hydrophilic substituent (such as sulfo, amino or hydroxyl). Examples of the dichroic dye include compounds described in the aforementioned Journal of Technical Disclosure, No. 2001-1745, p. 58.

In order to improve the contrast ratio of the liquid crystal display apparatus, the polarizing plate preferably has a transmittance as high as possible and a polarization degree as high as possible. The polarizing plate preferably has a transmittance at a wavelength of 550 nm within a range of 30 to 50%, more preferably 35 to 50% and most preferably 40 to 50%, and a polarization degree at a wavelength of 550 nm within a range of 90 to 100%, more preferably 95 to 100% and most preferably 99 to 100%.

<<Preparation of Elliptically Polarizing Plate>>

In case of a stretching method, the stretching magnification is preferably 2.5-30.0 times, and more preferably 3.0 to 10.0 times. The stretching can be executed by a dry stretching in the air. It may also be realized by a wet stretching in a state immersed in water. The stretching magnification is preferably 2.5 to 5.0 times in case of a dry stretching, and 3.0 to 10.0 times in case of a wet stretching. The stretching process may be divided into several steps, including an oblique stretching. Such several divided steps allow more uniform stretching even with a high stretching magnification. Prior to the oblique stretching, a certain stretching (in a level of preventing a shrinkage in the transversal direction) may be executed in the longitudinal or transversal direction. The stretching can be realized by a step of executing a tenter stretching, employed in the biaxial stretching, in different levels at the left and right side. The biaxial stretching is similar to the stretching method employed in ordinary film forming process. In such biaxial stretching, since the stretching speed is different between the left and right sides, the binder film before stretching is required to have different thicknesses at the left and right sides. In the casting film formation, a tapered die may be employed to obtain a difference, in the flow rate of the binder solution, between the left and right sides.

In case of a rubbing method, a rubbing process widely employed as the liquid crystal aligning process in LCD can be utilized. More specifically, an alignment is obtained by rubbing the surface of the alignment film in a predetermined direction with paper, gauze, felt, rubber, nylon or polyester fibers, thereby obtaining an orientation. In general, it is executed by several rubbing strokes, with a cloth uniformly having fibers of uniform length and thickness. It is preferably executed with a rubbing roll having a circularity, a cylindricality and an eccentricity of 30 μm or less. A wrapping angle of the film on the rubbing roll is preferably 0.1 to 90°. It is however also possible to achieve a stable rubbing process with a wrapping of 360° or more, as described in JPA No. hei 8-160430.

In case of a rubbing process on a film of a continuous web form, the film is preferably conveyed by a conveying apparatus at a speed of 1 to 100 m/min under a constant tension. In order to obtain an arbitrary rubbing angle, the rubbing roll is preferably made arbitrarily rotatable in a direction parallel to the film advancing direction. The rubbing angle is preferably selected within a range of 0 to 60°, and, for use in a liquid crystal display apparatus, preferably 40 to 50° and particularly preferably at 45°.

The linear polarizing film is preferably provided, on a surface thereof opposite to the optically anisotropic layer, with a polymer (i.e. structure having optically anisotropic layer/polarizing film/polymer film).

The polymer film may also be provided, on an outermost surface thereof, with an antireflective film having a stain resistance and a scratch resistance. Any known antireflective film may be employed for this purpose.

EXAMPLES

The invention will be further specifically described below with reference to the following Examples. Materials, reagents, amounts and proportions thereof, operations, and the like as shown in the following Examples can be properly changed so far as the gist of the invention is not deviated. Accordingly, it should not be construed that the scope of the invention is limited to the following specific examples.

Example 1

Two cell samples were prepared with glass substrates with electrodes of a size of 30×40 mm, and subjected to measurements of optical characteristics.

<Preparation of Alignment Film for Optically Anisotropic Layer>

To a surface of the glass substrate, a coating liquid of a following composition was applied by a #16 wire bar coater with an amount of 28 mL/m², and dried for 60 seconds with warm air of 60° C. and for 150 seconds with warm air of 90° C. Then the formed film was subjected to a rubbing process for obtaining an alignment parallel to an in-plane slow axis (parallel to casting direction) of the cellulose acetate film (thus the rubbing axis being parallel to the in-plane slow axis of cellulose acetate film).

| | |
|---|---|
| Composition of a coating liquid for forming an alignment film following denatured polyvinyl alcohol | 20 parts by mass |
| Water | 360 parts by mass |
| Methanol | 120 parts by mass |
| Glutaraldehyde (crosslinking agent) | 1.0 part by mass | denatured polyvinyl alcohol

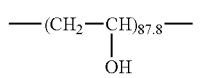

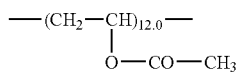

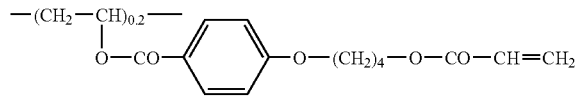

<Preparation of Optically Anisotropic Layer>

To a surface of the alignment film, a coating liquid prepared by dissolving 91.0 g of a following discotic (liquid crystalline) compound, 9.0 g of ethylene oxide-denatured trimethylolpropane triacrylate (V#360, manufactured by Osaka Organic Chemical Industry Ltd.), 2.0 g of cellulose acetate butyrate (CAB551-0.2, manufactured by Eastman Chemical Ltd.), 0.5 g of cellulose acetate butyrate (CAB531-1, manufactured by Eastman Chemical Ltd.), 3.0 g of a photopolymerization initiator (Irgacure 907, manufactured by Ciba-Geigy Ltd.), 1.0 g of a sensitizer (Kayacure DETX, manufacture by Nippon Kayaku Co.) and 1.3 g of a fluoroaliphatic group-containing copolymer (Megafac F780, manufactured by Dai-Nippon Inks and Chemicals Ltd.) in 207 g of methyl ethyl ketone, was applied with a #3.6 wire bar in an amount of 6.2 ml/m². It was then heated for 2 minutes in a thermostat zone of 130° C. to align the discotic molecules. It was then subjected to a UV irradiation, with a high-pressure mercury lamp of 120 W/cm, for 1 minute in an atmosphere of 60° C. to polymerize the discotic molecules. It was then let to cool to the room temperature. An optically anisotropic layer was formed in this manner to obtain an in-cell optical compensation film (glass substrate with optical compensation film):

discotic compound

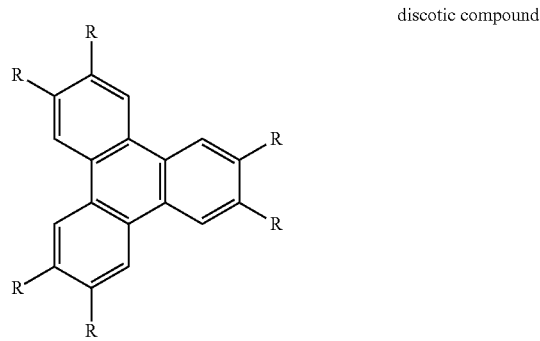

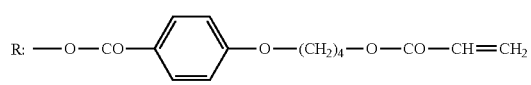

<Preparation of Liquid Crystal Cell>

The glass substrate with optical compensation film, prepared as described above, was cut into a size of 30×40 mm, then immersed in a solution, formed by diluting a home-use neutral detergent with 50 cc of water, for 30 minutes and was spontaneously dried. Also another glass substrate, separately rinsed, was cut into a size of 30×40 mm, then a material for forming an alignment layer of liquid crystal (JALS-2021-R1, manufactured by JSR Corp.) was applied to a surface of the substrate and subjected to a rubbing process. The two substrates were assembled with the compensation film and the rubbed surface at the inside, thereby obtaining a cell with an in-cell optical compensation layer. The liquid crystal cell had a cell gap of 3.6 μm between the substrates. A liquid crystal material having a negative dielectric anisotropy (MLC6608, manufactured by Merck Ltd.) was poured between the substrates and sealed therein, thereby obtaining a vertically aligned liquid crystal layer between the substrates. The liquid crystal layer had a retardation (a product Δn·d of thickness d (μm) of the liquid crystal layer and refractive index anisotropy Δn) of 300 nm. In this manner a VA-mode liquid crystal cell was prepared. Then a polarizing plate with two protective films, having Re of 2 nm and Rth of 40 nm, was placed on the upper side of the liquid crystal cell, and a polarizing plate with two protective films, having Re of 10 nm and Rth of 80 nm, was placed on the upper side of the liquid crystal cell, thus with a total Re of 57 nm and a total Rth of 275 nm in the liquid crystal cell.

<Measurement of Optical Characteristics>

Two cells thus prepared were so placed that the hybrid alignment directions of the discotic compound were mutually opposite as shown in FIG. 7(a), and a measurement was conducted for a measuring area of a diameter of 10 mm, with a luminance meter (for example BM-5, manufactured by TOPCON Ltd.). Results are shown in Table 1. At left and right, a color difference in a white state between when viewed in a vertical direction and in an oblique direction inclined by 60° to the right or left direction against the vertical direction, was 0.05. Similar results were obtained in the arrangement shown in FIG. 7(b).

Comparative Example 1

A liquid crystal cell was prepared in the same manner as Example 1, except that the optical compensation film was not formed, and that an optical compensation film formed of a stretched film was disposed outside the substrate. And, thus, a cell having an optical compensation film only outside the cell was produced. Total Re was selected as 57 nm, while total Rth was selected as 275 nm, and other structures were made same as in Example 1. The optical characteristics were measured in the same manner as Example 1. Results are shown in Table 1. A color difference in a black state was 0.05 as in Example 1, but a color difference in a white state was 0.1, suggesting that the displayed color will become pale.

Comparative Example 2

Only one liquid crystal cell prepared in Example 1 was subjected to a measurement of optical characteristics in the same manner as Example 1, with results shown in Table 1. Results were same as in Example 1, except that the color difference in a white state between when viewed in the vertical direction and in the oblique direction inclined to the right direction against the vertical direction, was 0.1.

TABLE 1

Color difference Δxy of displayed color between when viewed in the vertical
direction and in a viewing angle at azimuth 45° and polar angle 60°

| | Number of domains of compensation film | $Re_{550}$ (nm) | $Rth_{550}$ (nm) | Δxy in black color between in the oblique direction and in the vertical direction | Δxy in white color between in the left oblique direction and in the vertical direction | Δxy in white color between in the right oblique direction and in the vertical direction |
|---|---|---|---|---|---|---|
| Example 1 | 2 | 57 | 275 | 0.05 | 0.05 | 0.05 |
| Comparative Example 1 | 1 | 57 | 275 | 0.05 | 0.1 | 0.1 |
| Comparative Example 2 | 1 | 57 | 275 | 0.05 | 0.05 | 0.1 |

Example 2

Figure 8:
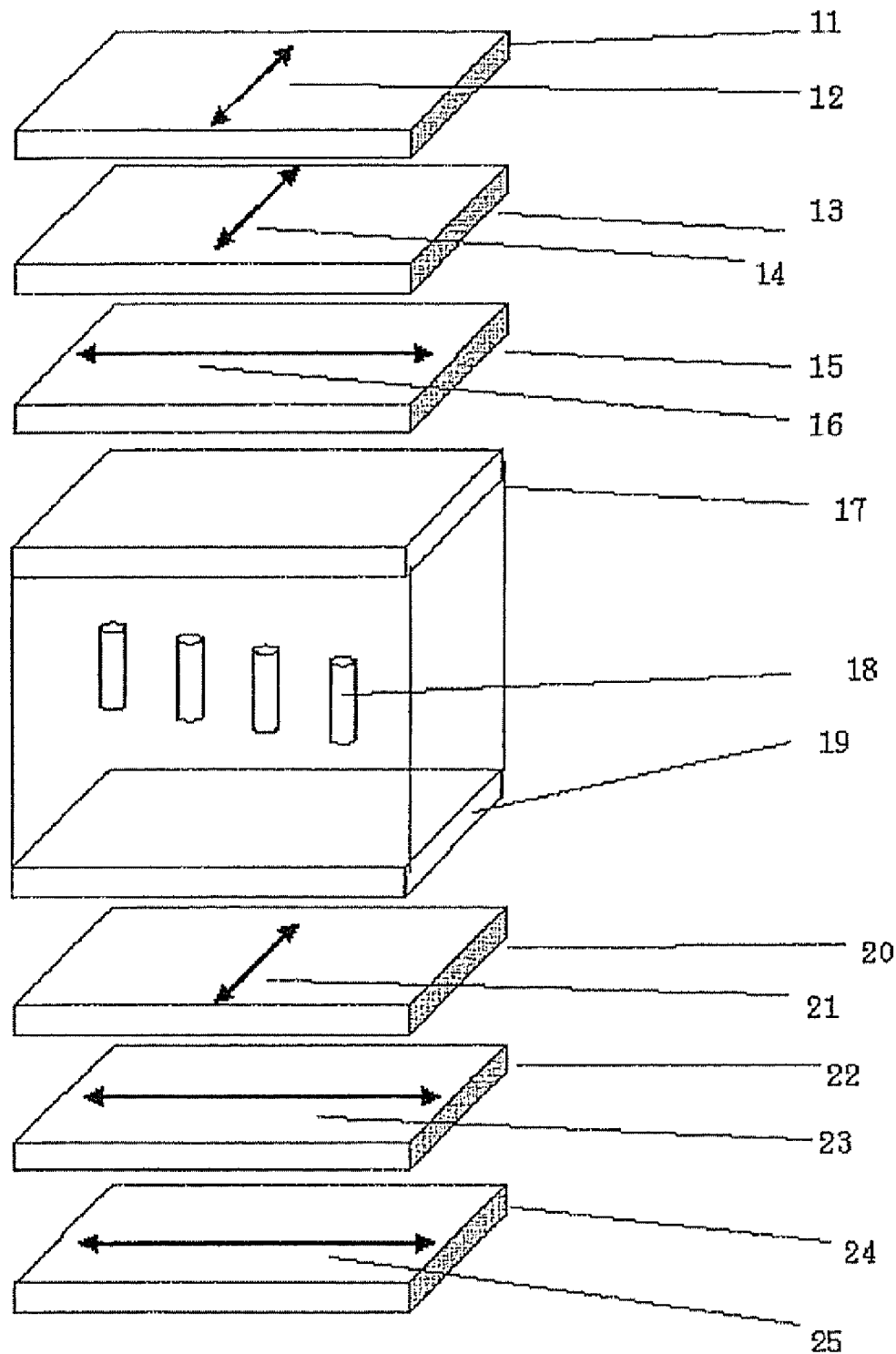
FIG. 8 is a schematic view showing constitution of a prior liquid crystal display apparatus.

An optical simulation was conducted for confirming the effect, on an assumed liquid crystal display apparatus of a structure similar to that shown in FIGS. 1 and 8, constituted by laminating, from the observing (upper) side, an upper polarizing plate (protective film 11, polarizing film 13, and protective film 15 (also serving as an optical compensation film)), a liquid crystal cell (upper substrate 17, liquid crystal layer 18 and lower substrate 19), and a lower polarizing plate (protective film 20 (also serving as an external optical compensation film), polarizing film 22 and protective film 24), and positioning a backlight source (not shown) thereunder. The optical calculation was carried out with LCD Master Cer. 6.08 of Syntech Inc. For the liquid crystal cell, substrates and polarizing plates, values of the materials commonly employed in the liquid crystal display were employed. The liquid crystal material was assumed to have a negative dielectric anisotropy with Δ∈=−4.2. The liquid crystal cell was substantially vertically aligned with a pretilt angle of 89.9°. The cell gap of the substrates was assumed as 3.6 μm, and the retardation of liquid crystal (namely a product Δn·d of thickness d (μm) of the liquid crystal layer and refractive index anisotropy Δn) was selected as 318 nm at a wavelength of 450 nm, 300 nm at a wavelength 550 nm and 295 nm at a wavelength of 650 nm. An optical compensation film formed by hybrid aligned discotic compound was provided between the substrate 19 and the liquid crystal layer 18. Simulation was carried out for a multi domain structure of 2 divisions by an expansion function of LCD Master. The average Re and Rth of the optical compensation film were set at values shown in Table 2. A light source C incorporated in LCD Master was adopted as the light source. The substrates 17, 19 were omitted in the simulation. Therefore, the optical compensation layer may be in any position between the polarizing film and the liquid crystal layer.

In the liquid crystal display apparatus of the structure shown in FIG. 1, results are identical when the positions of the backlight and the observer are mutually exchanged.

The optical simulation was carried out with the parameters found in the cell prepared in Example 1, as sample No. 1. Also simulations taking wavelength dispersion characteristics in consideration were executed as samples Nos. 2 to 6.

TABLE 2

Transmittance (%) in black state when viewed under an azimuth angle of 45° and a polar angle of 60°

| | No. | Wavelength 450 nm | | | wavelength 550 nm | | | Wavelength 650 nm | | | (Re450/Rth450)/(Re550/Rth550) | (Re650/Rth650)/(Re550/Rth550) | black state transmittance (%) | color aberration Δxy from center |
|---|---|---|---|---|---|---|---|---|---|---|---|---|---|---|
| | | Re450 (nm) | Rth450 (nm) | Re450/Rth450 | Re550 (nm) | Rth550 (nm) | Re550/Rth550 | Re650 (nm) | Rth650 (nm) | Re650/Rth650 | | | | |
| Example 1 | 1 | 57 | 276 | 0.21 | 57 | 275 | 0.21 | 57 | 275 | 0.21 | 1.0 | 1.0 | 0.025 | 0.11 |
| Example 2 | 2 | 52 | 281 | 0.19 | 57 | 275 | 0.21 | 64 | 274 | 0.23 | 0.89 | 1.13 | 0.02 | 0.08 |
| | 3 | 46 | 287 | 0.16 | 57 | 275 | 0.21 | 71 | 271 | 0.26 | 0.77 | 1.26 | 0.016 | 0.04 |
| | 4 | 40 | 293 | 0.14 | 57 | 275 | 0.21 | 78 | 270 | 0.29 | 0.66 | 1.39 | 0.012 | 0.035 |
| | 5 | 35 | 287 | 0.12 | 57 | 275 | 0.21 | 85 | 268 | 0.32 | 0.59 | 1.53 | 0.017 | 0.06 |
| | 6 | 30 | 281 | 0.11 | 57 | 275 | 0.21 | 92 | 267 | 0.34 | 0.52 | 1.66 | 0.021 | 0.075 |

According to the results shown in Table 2, the liquid crystal display apparatuses Nos. 2 to 6 of the invention in which, at a wavelength 450 nm and Δnd/λ=0.707 in the liquid crystal, the optical compensation film shows Re/λ of 0.056 to 0.113 and Rth/λ of 0.291 to 0.329, and, at a wavelength 650 nm and Δnd/λ=0.454 in the liquid crystal, the optical compensation film shows Re/λ of 0.089 to 0.129 and Rth/λ of 0.165 to 0.189, provide a smaller transmittance in the black state at a polar angle of 60°, in comparison with the liquid crystal display apparatus No. 1. Thus, based on the results shown in Table 2, it is understandable that the transmittance becomes minimum under conditions: Re/λ=0.073 and Rth/V=0.311 at a wavelength 450 nm, Re/λ=0.095 and Rth/V=0.233 at a wavelength 550 nm, and Re/λ=0.108 and Rth/V=0.177 at a wavelength 650 nm.

Also based on the results of simulation shown in Table 2, it is understandable that the liquid crystal display apparatuses Nos. 2 to 6 satisfying the aforementioned formulas (I) to (IV) show a smaller transmittance in the black state at the polar angle of 60° in comparison with the liquid crystal display apparatus No. 1, not satisfying these conditions. This means that the apparatuses Nos. 2 to 6 are improved in the viewing angle-dependent contrast change, in comparison with No. 1.

Example 3

In the liquid crystal cell of Example 1, an optical compensation layer was formed of a rod-like liquid crystal composition on the glass substrate, with an alignment direction parallel to a surface of the substrate and forming a crossing angle of 45° with the absorption axis 14 of the upper polarizing film 13. It was given a thickness of 1.8 µm and Re of 140 nm at a wavelength of 550 nm. Rth was 70 nm. It was photopolymerized by a UV irradiation by shielding a half area of the substrate from light, and the compensation film in an unpolymerized part was then removed by rinsing with isopropyl alcohol.

Under the liquid crystal cell, a white aluminum reflective film was provided in a portion corresponding to where the optical compensation film was formed, and a polarizing plate, with an absorption axis parallel to that of the upper polarizing plate, was provided in a portion corresponding to where the optical compensation film was removed.

In the visual observation of the optical characteristics in the absence of voltage application, the portion with the optical compensation film appeared purplish black color, while the portion where the optical compensation film was removed transmitted the backlight thereby giving a white color.

Also between the lower substrate and the lower polarizing plate in such removed portion, a polycarbonate compensation film having Re of 280 nm at a wavelength of 550 nm was so positioned as to form a crossing angle of 45° with the absorption axis of the polarizing plate. In the visual observation, both portions provided a black color, and both portions provided a white color under a voltage application of 5 V.

Example 4

In Example 3, a first optical compensation film was formed on the lower glass substrate, so as to have Re of 280 nm at a wavelength of 550 nm. Then by a process same as in Example 3, a second optical compensation film was formed on the first optical compensation film, so as to have an alignment direction perpendicular to that of the first optical compensation film. A total retardation was 140 nm in a portion having two-layered structure, and was 280 nm in a portion having a layer only, by a layer removal. In the portion corresponding to such layer-removed portion, no optical compensation film was provided outside the substrate. Other structures were same as those in Example 3.

In a visual observation of optical characteristics, the reflective portion provided a black state more colorless than in Example 3. Also the layer-removed transmitting portion showed an improvement in the transmittance by 5% in a white state, in comparison with the case where the compensation film is disposed inside the substrates.

Example 5

A liquid crystal display apparatus was prepared in the same manner as in Example 4, except that the first optical compensation film was prepared with a discotic compound. More specifically, a first optical compensation film was prepared with the disc face aligned vertically to the substrate surface and with an alignment direction perpendicular to the absorption axis of the upper polarizing plate. Also iodine was added to the coating liquid for the first optical compensation film to provide a function as a polarizing plate to the first optical compensation film.

A cell gap was 3.6 µm. Also a white aluminum reflective film was provided on a half of the outside surface of the lower substrate, thus forming a reflective portion and a transmission portion within a cell.

In a visual observation of optical characteristics, the transmittance in a white state was improved by 5% in comparison with Example 4.

INDUSTRIAL APPLICABILITY

According to the present invention, it is possible to provide a liquid crystal display apparatus, particularly a VA-mode liquid crystal display apparatus, in which a liquid crystal cell is exactly compensated optically, thereby providing a high contrast. In particular, according to the present invention, it is possible to provide a liquid crystal display apparatus and liquid crystal cell of VA mode, which are improved in the color reproducibility at an oblique angle in a white state, are decreased in the contrast change depending on a viewing angle, and are reduced in the peripheral part of the image displaying area.

CROSS-REFERENCE TO RELATED APPLICATIONS

This application claims benefit of priorities under 35 USC 119 to Japanese Patent Application No. 2005-058435 filed Mar. 3, 2005.

The invention claimed is:

1. A liquid crystal display apparatus comprising:
    a liquid crystal cell comprising a pair of substrates which are provided in mutually opposed manner and which has an electrode in at least either thereof, and a liquid crystal material supported between the pair of substrates;
    a first polarizing film disposed outside the liquid crystal cell;
    a second polarizing film disposed sandwiching the liquid crystal cell with the first polarizing film;
    at least one in-cell optical compensation film disposed between the pair of substrates, with plural domains per a pixel having a different mean alignment direction from each other, the in-cell optical compensation film being a layer formed of a composition comprising at least one discotic compound; and
    at least an external optical compensation film disposed between the first or second polarizing film and the liquid crystal cell,
    wherein all the at least one in-cell optical compensation film and the at least one external optical compensation film have a total Re within a range of 20 to 70 nm and a total Rth within a range of 70 to 200 nm.

2. The liquid crystal display apparatus of claim 1, wherein the in-cell optical compensation film is formed of a composition comprising at least one liquid crystalline compound.

3. The liquid crystal display apparatus of claim 1, wherein molecules in the in-cell optical compensation film are aligned in a hybrid alignment state with regard to a film plane.

4. The liquid crystal display apparatus of claim 1, wherein a thickness d (unit: nm) of the liquid crystal layer, a refractive index anisotropy $\Delta n(\lambda)$ of the liquid crystal layer at a wavelength $\lambda$, (unit: nm), a total average planar retardation $Re(\lambda)$ of the in-cell optical compensation film and the external optical compensation film at a wavelength $\lambda$ and a total average retardation $Rth(\lambda)$ in thickness direction at a wavelength $\lambda$ satisfy, in at least two different wavelengths within a wavelength region of 380 to 780 nm, following formulas (V) to (VIII):

$$100 \leq \Delta n(\lambda) \times d \leq 1000, \quad (V)$$

$$Rth(\lambda)/\lambda = E \times \Delta n(\lambda) \times d/\lambda, \quad (VI)$$

$$Re(\lambda)/\lambda = F \times \lambda/\{\Delta n(\lambda) \times d\} + G, \text{ and} \quad (VII)$$

$$0.726 \leq E - 0.958, \quad (VIII)$$

wherein $0.0207 \leq F \leq 0.0716$ and $G=0.032$.

5. The liquid crystal display apparatus of claim 1, wherein the in-cell optical compensation film comprises plural domains, one of which retardation value is different from that of another domain.

6. The liquid crystal display apparatus of claim 1, wherein a retardation value or a mean alignment direction varies discontinuously along with a thickness direction in a region, corresponding to a pixel, of the in-cell optical compensation film.

7. The liquid crystal display apparatus of claim 1, wherein the in-cell optical compensation film comprises a dye.

* * * * *